(12) United States Patent
Isozaki et al.

(10) Patent No.: US 10,283,747 B2
(45) Date of Patent: May 7, 2019

(54) NONAQUEOUS ELECTROLYTE SECONDARY BATTERY AND BATTERY PACK

(71) Applicant: KABUSHIKI KAISHA TOSHIBA, Minato-ku (JP)

(72) Inventors: Yoshiyuki Isozaki, Nerima (JP); Norio Takami, Yokohama (JP); Shinsuke Matsuno, Minato (JP); Keigo Hoshina, Yokohama (JP); Yuma Kikuchi, Kazhiwazaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 282 days.

(21) Appl. No.: 15/125,513

(22) PCT Filed: Mar. 17, 2014

(86) PCT No.: PCT/JP2014/057142
§ 371 (c)(1),
(2) Date: Feb. 6, 2017

(87) PCT Pub. No.: WO2015/140902
PCT Pub. Date: Sep. 24, 2015

(65) Prior Publication Data
US 2017/0187022 A1    Jun. 29, 2017

(51) Int. Cl.
H01M 2/16    (2006.01)
H01M 4/48    (2010.01)
H01M 4/485   (2010.01)
H01M 10/0525 (2010.01)
H01M 10/058  (2010.01)
H01M 4/58    (2010.01)

(52) U.S. Cl.
CPC .......... H01M 2/162 (2013.01); H01M 4/483 (2013.01); H01M 4/485 (2013.01); H01M 4/5825 (2013.01); H01M 10/058 (2013.01); H01M 10/0525 (2013.01); H01M 2220/20 (2013.01); Y02T 10/7011 (2013.01)

(58) Field of Classification Search
CPC ...... H01M 2/162; H01M 4/483; H01M 4/485; H01M 4/5825; H01M 10/0525; H01M 2220/20
See application file for complete search history.

(56) References Cited

U.S. PATENT DOCUMENTS 6,114,070 A * 9/2000 Yoshida ............ H01M 10/0568
429/231.8
2003/0118896 A1    6/2003  Yamaguchi et al.
2006/0222936 A1   10/2006  Yamaguchi et al.
2008/0050655 A1 *  2/2008  Chu .................... H01M 4/131
429/231.8
2009/0081534 A1    3/2009  Takami et al.
2010/0233523 A1    9/2010  Jo et al.
2011/0039145 A1    2/2011  Abe et al.
2011/0229750 A1 *  9/2011  McLellan ............ H01M 2/162
429/144
2012/0214044 A1    8/2012  Takami et al.
2012/0295165 A1 * 11/2012  Morin .................. D21H 13/10
429/247
2014/0093761 A1 *  4/2014  Sakanaka ............ H01M 4/364
429/82
2014/0106225 A1    4/2014  Matsuno et al.
2014/0227602 A1    8/2014  Sumida et al.
2015/0010798 A1    1/2015  Sawai et al.

FOREIGN PATENT DOCUMENTS

| JP | 8-203490 A | 8/1996 |
| JP | 2002-319386 A | 10/2002 |
| JP | 2008-41581 A | 2/2008 |
| JP | 2009-81048 A | 4/2009 |
| JP | 2009-199798 A | 9/2009 |
| JP | 2009-283273 A | 12/2009 |
| JP | 2010-500717 A | 1/2010 |
| JP | 2010-225809 A | 10/2010 |
| JP | 2010-231957 A | 10/2010 |
| JP | 2012-19516 A | 10/2012 |
| JP | 2013-4284 A | 1/2013 |
| JP | 2013-178934 A | 9/2013 |
| JP | 5355828 B1 | 11/2013 |
| WO | WO 99/34470 | * 7/1999 |
| WO | WO 2009/151054 A1 | 12/2009 |

(Continued)

OTHER PUBLICATIONS

Machine translation of WO 99/34470, published on Jul. 8, 1999 (Year: 1999).*

(Continued)

Primary Examiner — Anca Eoff
(74) Attorney, Agent, or Firm — Oblon, McClelland, Maier & Neustadt, L.L.P.

(57) ABSTRACT

A nonaqueous electrolyte secondary battery of the present invention includes a positive electrode containing olivine-structured Fe or a Mn-containing phosphorus compound as a positive electrode active material; a negative electrode containing a titanium-containing metal oxide capable of inserting and extracting lithium ions as a negative electrode active material; a nonwoven fabric separator, which contains an electrically insulating fiber and is bonded to a surface of at least one of the positive electrode and the negative electrode; and a nonaqueous electrolyte. In a thickness direction of the nonwoven fabric separator, a density of the fiber on a side having contact with the positive electrode is high, and a density of the fiber on a side having contact with the negative electrode is low.

13 Claims, 8 Drawing Sheets

(56) References Cited

FOREIGN PATENT DOCUMENTS

WO    WO 2012/043119 A1    4/2012
WO    WO 2013/128652    *    9/2013

OTHER PUBLICATIONS

International Search Report dated Apr. 8, 2014 in PCT/JP2014/057142 (with English translation).

* cited by examiner

NONAQUEOUS ELECTROLYTE SECONDARY BATTERY AND BATTERY PACK

FIELD

Embodiments described herein relate generally to a nonaqueous electrolyte secondary battery and a battery pack.

BACKGROUND

In recent years, the active research and development have been carried out on a nonaqueous electrolyte secondary battery, in which charge/discharge is carried out through the movement of lithium ions between a negative electrode and a positive electrode, as a high-energy density battery. In the past, a lithium ion secondary battery, which includes a positive electrode containing $LiCoO_2$ or $LiMn_2O_4$ as an active material and a negative electrode containing a carbonaceous material that inserts and extracts lithium, has been widely put into practical use for a portable device.

In recent years, this type of lithium ion secondary battery has been widely used as an electric power source for a vehicle such as an electric vehicle or a hybrid vehicle using an engine and a motor in combination from the viewpoint of environmental problems.

When mounting lithium ion secondary battery on a vehicle such as an electric vehicle or a hybrid vehicle, a lithium ion secondary battery is required to have storage performance under a high-temperature environment, cycle characteristics, and long-term reliability on high output.

Also, it is currently difficult to mount a lithium ion secondary battery on an engine room of a motor vehicle so as to be used as a substitute for a lead storage battery. Therefore, it is required to improve the high-temperature durability (for example, 80° C. or more).

For this reason, constituent materials of a battery such as a positive electrode, a negative electrode, and a separator are required to be a material excellent in chemical and electrochemical stability, strength, and corrosion resistance.

As a material excellent in thermal stability in a high-temperature environment, lithium iron phosphate ($LiFePO_4$), which is one of lithium phosphate metal compounds having an olivine crystal structure, is known. Lithium iron phosphate has been used as a positive electrode active material of a lithium ion secondary battery. However, lithium iron phosphate has low electron conductivity, and thus, it is not possible to obtain high output in a lithium ion secondary battery. Moreover, when using a carbon material for a negative electrode, the deterioration caused by the precipitation of metal lithium in a low-temperature environment is enhanced.

Meanwhile, as a separator for a lithium ion secondary battery, a polyolefin-based microporous polymer film (film) or a nonwoven fabric comprised of a cellulose fiber has been used. However, in a conventional separator such as a polyolefin-based microporous polymer film or a nonwoven fabric comprised of a cellulose fiber, a pinhole is easily formed when reducing the thickness. For this reason, in the lithium ion secondary battery, an internal short-circuit easily occur, and self-discharge easily occurs during high-temperature storage.

In particular, a polyolefin-based microporous polymer film has a low melting point, and thus, is thermally shrunk in a high-temperature environment (for example, 100° C.). For this reason, the positive electrode and the negative electrode may have direct contact with each other, to thereby cause internal short-circuit, and some of micropores are melted and closed, to thereby cause the decrease in output of a battery.

In this background, a separator-electrode-integrated storage device formed by integrally joining a separator to a surface of an electrode has been created. However, in spite of this technique, a lithium ion secondary battery having excellent high-temperature durability (for example, 80° C. or more) and high output has not been achieved.

BRIEF DESCRIPTION OF DRAWINGS

FIG. 1 is the scanning electron microscope image obtained by observing the cross-section of the nonwoven fabric separator.

DETAILED DESCRIPTION

Figure 1:
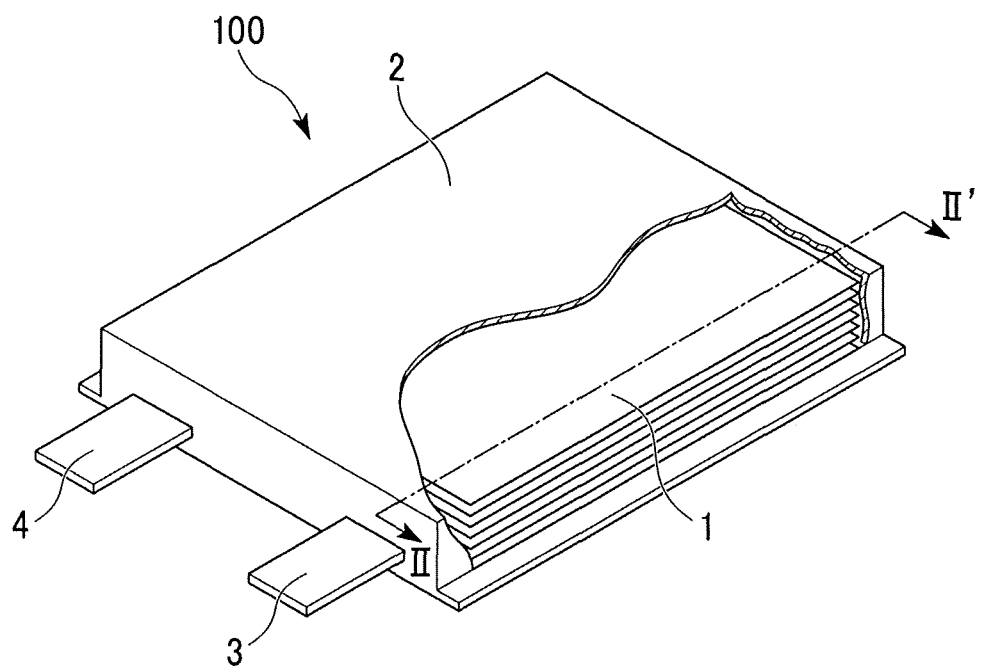
FIG. 1 is a schematic perspective view illustrating the nonaqueous electrolyte secondary battery according to the 1st embodiment in which the nonaqueous electrolyte secondary battery is partially cut off.

Hereinafter, the embodiments are described with reference to the Drawings.

First Embodiment

The nonaqueous electrolyte secondary battery according to the 1st embodiment is described.

The nonaqueous electrolyte secondary battery according to the present invention includes a positive electrode, a negative electrode, a nonwoven fabric separator bonded to a surface of at least one of the positive electrode and the negative electrode, and a nonaqueous electrolyte.

The positive electrode contains olivine-structured Fe or a Mn-containing phosphorus compound as a positive electrode active material. The negative electrode contains a titanium-containing metal oxide capable of inserting and extracting lithium ions as a negative electrode active material. The nonwoven fabric separator contains an electrically insulating fiber. In a thickness direction of the nonwoven fabric separator, a density of the fiber on a side having contact with the positive electrode is high, and a density of the fiber on a side having contact with the negative electrode is low.

In the titanium-containing metal oxide capable of inserting and extracting lithium ions which is a negative electrode active material, volume change such as expansion and contraction hardly occur during charge/discharge. On the other hand, the olivine-structured Fe and the Mn-containing phosphorus compound (i.e. a positive electrode active material) can expand and contract during charge/discharge. The olivine-structured Fe and the Mn-containing phosphorus compound expand when lithium is extracted from the crystal by charge, and contract when lithium is inserted into the crystal by discharge. This volume change reaches about 7% at the maximum. Thus, in the conventional nonaqueous electrolyte secondary battery, wherein the titanium-containing metal oxide capable of inserting and extracting lithium ions is used for the negative electrode and the olivine-structured Fe or the Mn-containing phosphorus compound is used for the positive electrode, the repetition of charge/discharge results in the increase in the internal resistance caused by the increase in the resistance of the positive electrode. Moreover, this phenomenon is enhanced at a high temperature. For these reasons, the simple use of the titanium-containing metal oxide capable of inserting and extracting lithium ions for the negative electrode and the simple use of the olivine-structured Fe or the Mn-containing phosphorus compound for the positive electrode are not enough to obtain a nonaqueous electrolyte secondary battery excellent in output characteristics and high-temperature durability (cycle characteristics).

In the nonaqueous electrolyte secondary battery according to the present embodiment, the negative electrode contains the titanium-containing metal oxide capable of inserting and extracting lithium ions as the negative electrode active material, and the positive electrode contains the olivine-structured Fe or the Mn-containing phosphorus compound as the positive electrode active material. The separator is the nonwoven fabric separator, and in the thickness direction of the nonwoven fabric separator, the density of the fiber on the side having contact with the positive electrode is high (a large amount of fiber per unit volume of the nonwoven fabric separator), and the density of the fiber on the side having contact with the negative electrode is low (a small amount of fiber per unit volume of the nonwoven fabric separator). Thus, the increase in the interfacial resistance between the positive electrode and the separator during charge/discharge is small, and it is possible to suppress the increase in the internal resistance of the battery.

It can be considered that this is for the following reason. In the thickness direction of the nonwoven fabric separator, the density of the fiber on the side having contact with the positive electrode is high, and the nonwoven fabric separator has a sufficient liquid-holding property for an electrolyte solution on the side of the positive electrode. Thus, even if charge contracts the volume of the positive electrode, lots of nonaqueous electrolyte and nonaqueous electrolyte solution can be present between the positive electrode and the nonwoven fabric separator, and the interfacial resistance hardly increases.

Also, the titanium-containing metal oxide capable of inserting and extracting lithium ions can insert and extract lithium ions at a potential of 1 V (vs. $Li/Li^+$) or more. For example, a spinel-structured lithium titanate has a potential for inserting and extracting lithium of 1.55 V (vs. $Li/Li^+$). In this manner, in the nonaqueous electrolyte secondary battery using the negative electrode active material capable of inserting and extracting lithium at a high potential, it is possible to suppress the formation of lithium dendrite even after the repetition of charge/discharge. For this reason, it is possible to increase the porosity of the nonwoven fabric separator and to enhance the diffusion of lithium ions in the thickness direction of the nonwoven fabric separator. Also, in the nonaqueous electrolyte secondary battery according to the present embodiment, by increasing the porosity of the nonwoven fabric separator, it is possible to decrease the contact area between the nonwoven fabric separator and the surface of the negative electrode. The smaller the contact area is, the further the loss of the movement of lithium ions can be decreased.

Moreover, in the nonaqueous electrolyte secondary battery according to the present embodiment, as the nonwoven fabric separator, it is possible to use the fiber which is made of the organic material which contains, for example, polyamide-imide.

In a polyolefin-based separator which has been conventionally used as a separator for a nonaqueous electrolyte secondary battery, the mechanical strength decreases when the porosity is increased. Particularly when the porosity is adjusted to 60% or more, the decrease in the mechanical strength becomes significant. For this reason, it is not possible to reduce the thickness of a polyolefin-based separator. In order to increase the porosity of the polyolefin-based separator, the thickness is required to be 20 μm or more. Also, the melting point of polyolefin is as low as 140° C. to 160° C. and thus, a polyolefin-based separator is thermally shrunk when being exposed in a high-temperature environment (for example, 100° C.). Then, the positive electrode and the negative electrode may have direct contact with each other, to thereby cause the internal short-circuit of a battery. Even if the internal short-circuit does not occur, some of micropores of a polyolefin-based separator may be melted and closed, to thereby cause the decrease in the output of a battery.

In contrast, the polyamide-imide has high thermal resistance (continuously usable temperature: 250° C.) and high mechanical strength. For these reasons, according to the present embodiment, it is possible to achieve the nonaqueous electrolyte secondary battery having excellent durability even in a high-temperature environment.

Also, in the nonaqueous electrolyte secondary battery using a carbon material that is a negative electrode material having been conventionally used, it is difficult to use a separator having small thickness and high porosity for the following reasons.

The lithium ion insertion/extraction potential of a carbon material is less noble than the titanium-containing metal oxide capable of inserting and extracting lithium ions. Thus, in the nonaqueous electrolyte secondary battery using a carbon material for the negative electrode, lithium dendrites can be inevitably precipitated on the surface of the negative electrode when charge/discharge is repeated. Lithium dendrites are deposited on the surface of the negative electrode, and thus, when the pores of the separator communicate with each other in the thickness direction, lithium dendrites can pass through the separator, to thereby cause the short-circuit between the positive electrode and the negative electrode.

As described above, in the nonaqueous electrolyte secondary battery using a carbon material for the negative electrode, it is difficult to use the separator having small thickness and high porosity in terms of the risk of the occurring of a short-circuit and the safety relating to a short-circuit.

As described in the following Examples, the present inventors confirmed that a short-circuit occurred due to the precipitation of lithium dendrites in the nonaqueous electrolyte secondary battery in which the nonwoven fabric separator is bonded to the surface of the negative electrode formed by using graphite as a carbon material.

As described above, the nonaqueous electrolyte secondary battery according to the embodiment, the increase in the interfacial resistance between the positive electrode and the separator during charge/discharge is small, and it is possible to suppress the increase in the internal resistance. Also, the thickness of the separator is small, and the porosity is high. Also, the high-temperature durability is excellent. For these reasons, it is possible to achieve the nonaqueous electrolyte secondary excellent in output characteristics and charge/discharge cycle characteristics even at a high temperature of 80° C. or more.

Hereinafter, the positive electrode, the negative electrode, the nonaqueous electrolyte and the separator, which are the components of the nonaqueous electrolyte secondary battery according to the present embodiment, are described in detail.

(1) Positive Electrode

The positive electrode includes a positive electrode current collector and a positive electrode layer which is formed on one surface or both surfaces of the positive electrode current collector and contains a positive electrode active material, an electroconductive agent and a binder. An electroconductive agent and a binder are optional components.

The positive electrode contains olivine-structured Fe or the Mn-containing phosphorus compound as the positive electrode active material. The positive electrode active material can be used singly or in combination of 2 types or more.

The olivine-structured Fe or the Mn-containing phosphorus compound is used as the 1st positive electrode active material. Examples of the olivine-structured Fe or a Mn-containing phosphorus compound include lithium iron phosphate ($Li_dFePO_4$, d can increase or decrease within a range of $0 \leq d \leq 1$ by the charge/discharge reaction), lithium iron manganese phosphate ($Li_dFe_xMn_{1-x}PO_4$, d can increase or decrease within a range of $0 \leq d \leq 1$ by the charge/discharge reaction, x satisfies the formula of $0.5 \leq x \leq 1$), lithium manganese phosphate ($Li_dMnPO_4$, d can increase or decrease within a range of $0 \leq d \leq 1$ by the charge/discharge reaction), and lithium manganese iron phosphate ($Li_dMn_xFe_{1-x}PO_4$, d can increase or decrease within a range of $0 \leq d \leq 1$ by the charge/discharge reaction, and x satisfies the formula of $0.5 \leq x \leq 1$). Also, it is acceptable that the first positive electrode active material contains metal elements other than Mn and Fe such as Co, Ni, Al and Mg.

Among these, the M-containing composition is preferable because it is possible to improve the positive electrode potential. The more preferable range of the molar ratio x of Mn is $0.67 \leq x \leq 0.9$. By setting the molar ratio x of Mn within this range, it is possible to improve the effect of suppressing the overcharge reaction of the positive electrode and the self-discharge reaction of the negative electrode. Moreover, it is possible to increase the battery capacity.

The olivine-structured Fe or the Mn-containing phosphorus compound has an insulating property, and therefore, it is preferable to coat the surface of the particle with an electroconductive material such as carbon. Examples of carbon include the carbonaceous material in which the surface spacing d002 of the (002) plane observed by X-ray diffraction is 0.37 nm.

Examples of the method for coating the surface of the particle of the olivine-structured Fe or the Mn-containing phosphorus compound with an electroconductive material include the method in which the particle of the olivine-structured Fe or the Mn-containing phosphorus compound is dispersed in a carbon component-containing solution, and the resultant dispersion is dried and fired in a reducing atmosphere at 400° C. to 800° C. Through this method, it is possible to obtain the 1st positive active material in which the surface of the particle of the olivine-structured Fe or the Mn-containing phosphorus compound is coated with an electroconductive material.

As the 2nd positive electrode active material, the lithium transition metal composite oxide is used. Examples of the lithium transition metal oxide include $LiCoO_2$, $LiNi_{1-x}Co_xO_2$ ($0 \leq x \leq 0.5$), $LiMn_xNi_yCo_zO_2$ ($0 < x < 0.5$, $0 < y < 0.5$, $0 < z < 0.5$), and $LiMn_{2-x}M_xO_4$ (M represents at least one selected from the group consisting of Li, Mg, Co, Al and Ni, $0 < x < 0.2$).

The blending ratio of the 2nd positive electrode active material is preferably 1 part by mass or more and 40 parts by mass with respect to 100 parts by mass of the olivine-structured Fe or the Mn-containing phosphorus compound which are the 1st positive electrode active material.

The electroconductive agent improves the current collection performance of the positive electrode active material and suppresses the contact resistance between the positive electrode active material and the positive electrode current collector. Examples of the electroconductive agent include an agent containing acetylene black, carbon black, artificial graphite, natural graphite, a carbon fiber or a conductive polymer.

The electroconductive agent can be used singly or in combination of 2 types or more.

A carbon fiber having a vapor-grown fiber diameter of 1 μm or less is particularly preferable as the electroconductive agent. By using this carbon fiber, it is possible to improve the network of the electron conductivity inside the positive electrode, and thus, it is possible to significantly improve the output performance of the positive electrode.

The binder fills spaces among the dispersed positive electrode active materials to thereby bind the positive active material and the electroconductive agent, and bind the positive electrode active material and the positive electrode collector.

Examples of the binder include an organic material containing polytetrafluoroethylene (PTFE), polyvinylidene fluoride (PVdF), a fluorine-based rubber or polyacrylic acid.

The binder can be used singly or in combination of 2 types or more.

Also, as an organic solvent for dispersing the binder, for example, it is possible to use N-methyl-2-pyrrolidone (NMP), dimethylformamide (DMF) or the like.

Regarding the blending ratios of the positive electrode active material, the electroconductive agent and the binder, the positive electrode active material is preferably blended at 80 mass % or more and 95 mass % or less, the electroconductive agent is preferably blended at 3 mass % or more and 19 mass % or less, and the binder is preferably blended at 1 mass % or more and 9 mass % or less.

By setting the blending ratio of the electroconductive agent to 3 mass % or more, it is possible to improve the current collection performance of the positive electrode active material and to suppress the contact resistance between the positive electrode active material and the positive electrode current collector. Also, by setting the blending ratio of the electroconductive agent to 19 mass % or less, it is possible to reduce the decomposition of the nonaqueous electrolyte on the surface of the electroconductive agent in high-temperature preservation.

By setting the blending ratio of the binder to 1 mass % or more, it is possible to obtain the sufficient electrode strength. Also, by setting the blending ratio of the binder to 9 mass % or less, it is possible to reduce the blending amount of the insulator of the positive electrode and to reduce the internal resistance.

It is preferable that the positive electrode current collector be formed of an aluminum foil or an aluminum alloy foil. The thickness of the positive electrode current collector is preferably 20 µm or less, more preferably 15 µm or less, and much more preferably 10 µm or less.

The positive electrode can be produced as follows. For example, the positive electrode active material, the electroconductive agent and the binder are suspended in a general solvent to prepare a slurry. This slurry is applied to the positive electrode current collector, followed by drying. Then, the positive electrode current collector is subjected to pressing, to thereby produce the positive electrode. Alternatively, the positive electrode can be produced as follows. The positive electrode active material, the electroconductive agent and the binder are molded in a pellet form to prepare the positive electrode layer. This positive electrode layer is placed on the positive electrode current collector, followed by molding, to thereby produce the positive electrode.

(2) Negative Electrode

The negative electrode includes a negative electrode current collector and a negative electrode layer which is formed on one surface or both surfaces of the negative electrode current collector and contains a negative electrode active material, an electroconductive agent and a binder. An electroconductive agent and a binder are optional components.

As a negative electrode active material, it is possible to use a titan-containing metal oxide capable of inserting and extracting lithium ions.

In the negative electrode containing the titanium-containing metal oxide as a negative electrode active material, the lithium insertion and extraction potential with respect to the electrode potential of a lithium metal is preferably 2.5 V (vs. Li/Li$^+$) to 1 V (vs. Li/Li$^+$), and more preferably 2 V (vs. Li/Li$^+$) to 1.3 V (vs. Li/Li$^+$). When the lithium insertion and extraction potential is within the aforementioned range of the negative electrode potential, it is possible to obtain the assembly battery having a high capacity and good life performance. The negative electrode active material can be used singly or in combination of 2 types or more.

Examples of the titan-containing metal oxide include a titanium oxide, a lithium titanium oxide and a niobium titanium oxide.

The titanium oxide can be represented by the general formula $Li_aTiO_2$ ($0 \leq a \leq 2$). In this case, the composition formula before charge is $TiO_2$. Examples of the titanium oxide include a titanium oxide having a monoclinic structure (bronze structure (B)), a titanium oxide having a rutile structure and a titanium oxide having an anatase structure. $TiO_2$ (B) having a monoclinic structure (bronze structure (B)) is preferable, and it is preferable that this titanium oxide have a low crystallinity prepared by the thermal treatment at 300° C. to 600° C.

Examples of a lithium titanium oxide include an oxide having a spinel structure (for example, the general formula $Li_{4/3+a}Ti_{5/3}O_4$ ($0 \leq a \leq 2$)), an oxide having a ramsdellite structure (for example, the general formula $Li_{2+a}Ti_3O_7$ ($0 \leq a \leq 1$)), $Li_{1+b}Ti_2O_4$ ($0 \leq b \leq 1$), $Li_{1.1+b}Ti_{1.8}O_4$ ($0 \leq b \leq 1$), $Li_{1.07+b}Ti_{1.86}O_4$ ($0 \leq b \leq 1$), and a lithium-titanium-containing composite oxide having at least one element selected from the group consisting of Nb, Mo, W, P, V, Sn, Cu, Ni and Fe.

Examples of a niobium titanium oxide include an oxide represented by the general formula $Li_cNb_dTiO_7$ ($0 \leq c \leq 5$, $1 \leq d \leq 4$).

It is preferable that the titan-containing metal oxide contain at least one selected from the group consisting of a lithium titanium oxide having a ramsdellite structure, a lithium titanium oxide having a spinel structure, a titanium oxide having a monoclinic structure, and a niobium titanium oxide. Also, by blending at least one selected from the group consisting of a lithium titanium oxide having a ramsdellite structure, a titanium oxide having a monoclinic structure, and a niobium titanium oxide in the negative electrode, the voltage curve of the battery can have moderate tilt. For this reason, the state of charge (SOC) of the battery can be easily measured only by voltage monitoring. Also, the influence of the variation among the batteries is small in the battery pack, and it is possible to control only by voltage monitoring.

The average particle size of the primary particles of the negative electrode active material is preferably within a range of 0.001 µm to 1 µm. By setting the average particle size to 0.001 µm or more, it is possible to equalize the distribution of the nonaqueous electrolyte and to suppress the depletion of the nonaqueous electrolyte in the positive electrode. By setting the average particle size to 1 µm or less, it is possible to suppress the decrease in the porosity of the negative electrode when the specific surface area of the negative electrode is set to 3 m$^2$/g to 50 m$^2$/g.

Also, it is possible to obtain the good performance even when the shape of the negative electrode active material is any of a particle shape and a fiber shape. When the shape is a fiber shape, the fiber diameter is preferably 0.1 µm or less.

In the negative electrode active material, the average particle size is preferably 1 µm or less, and the specific surface area based on the BET method using N$_2$ adsorption is preferably within the range of 3 m$^2$/g to 200 m$^2$/g. By setting these ranges, it is possible to further enhance the affinity of the negative electrode for the nonaqueous electrolyte.

The specific surface area of the negative electrode is preferably within a range of 3 m$^2$/g to 50 m$^2$/g, and more preferably within a range of 5 m$^2$/g to 50 m$^2$/g. By setting these ranges, it is possible to further improve the output performance and the charge/discharge cycle performance of the nonaqueous electrolyte secondary battery. Herein, the specific surface area of the negative electrode means a surface area per 1 g of the negative electrode (except for the mass of the current collector). Also, the negative electrode layer is a porous layer which is formed on the negative electrode current collector and contains the negative electrode active material, the electroconductive agent and the binder.

The porosity of the negative electrode (except for the current collector) is preferably within a range of 20% to 50%, and more preferably a range of 25% to 40%. By setting these ranges, it is possible to obtain the negative electrode which has a high density and is excellent in the affinity for the nonaqueous electrolyte.

The negative electrode current collector is preferably an aluminum foil or an aluminum alloy foil.

The thickness of the negative electrode current collector is preferably 20 µm or less, more preferably 15 µm or less, and much more preferably 10 µm or less.

The purity of an aluminum foil is preferably 99.99% or more.

An aluminum alloy is preferably an alloy having an element such as magnesium, zinc or silicon. On the other hand, it is preferable to adjust the content of a transition metal such as iron, copper, nickel or chromium to 100 ppm or less.

The electroconductive agent improves the current collection performance of the negative electrode active material, and suppresses contact resistance between the negative electrode active material and the negative electrode current collector.

Examples of the electroconductive agent include acetylene black, carbon black, coke, a carbon fiber, graphite, a metal compound powder, and a metal powder. More preferable examples of the electroconductive agent include coke which has an average particle size of 10 μm or less and is obtained by using a thermal treatment temperature of 800° C. to 2000° C., graphite, TiO, TiC, TiN, and metal powders such as Al, Ni, Cu and Fe.

The binder fills spaces between the dispersed negative electrode active materials to thereby bind the negative active material and the electroconductive agent, and bind the negative electrode active material and the negative electrode collector.

Examples of the binder include an agent containing polytetrafluoroethylene (PTFE), polyvinylidene fluoride (PVdF), a fluorine-based rubber, a styrene-butadiene rubber, a core shell binder or polyacrylic acid.

Regarding the blending ratios of the negative electrode active material, the electroconductive agent, and the binder, the negative electrode active material is preferably blended at 80 mass % or more and 95 mass % or less, the electroconductive agent is preferably blended at 1 mass % or more and 18 mass % or less, and the binder is preferably blended at 2 mass % or more and 7 mass %.

By setting the blending ratio of the electroconductive agent to 1 mass % or more, it is possible to improve the current collection performance of the negative electrode layer and the large current characteristics of the nonaqueous electrolyte secondary battery.

Also, by setting the blending ratio of the binder to 2 mass % or more, it is possible to improve the binding property between the negative electrode layer and the negative electrode current collector and the cycle characteristics.

On the other hand, it is preferable to set the blending ratio of the electroconductive agent to 18 mass % or less and to set the blending ratio of the binder to 7 mass % or less in terms of the achievement of high capacity of the nonaqueous electrolyte secondary battery.

The negative electrode can be produced as follows. For example, the negative electrode active material, the electroconductive agent and the binder are suspended in a general solvent to prepare a slurry. This slurry is applied to the negative electrode current collector, followed by drying. Then, the negative electrode current collector is subjected to pressing, to thereby produce the negative electrode. Alternatively, the negative electrode can be produced as follows. The negative electrode active material, the electroconductive agent and the binder are molded in a pellet form to prepare the negative electrode layer. This negative electrode layer is placed on the negative electrode current collector, followed by molding, to thereby produce the negative electrode.

(3) Separator

The nonwoven separator contains an electrically insulating fiber. The nonwoven fabric containing an electrically insulating fiber has substantially no electroconductivity. In the present embodiment, the "substantially no electroconductivity" means that electrons do not move in a molecule or electrons do not perform hopping conduction between molecules. This nonwoven fabric can pass lithium ions through without passing electrons through, and thus, functions as the separator of the nonaqueous electrolyte secondary battery.

In the nonaqueous electrolyte secondary battery according to the present embodiment, the negative electrode contains the titanium-containing metal oxide capable of inserting and extracting lithium ions as the negative electrode active material. In the nonaqueous electrolyte secondary battery using the titanium-containing metal oxide capable of inserting and extracting lithium ions as the negative electrode active material, the volume change such as expansion and contraction during charge/discharge hardly occurs. Thus, the force, which is applied from the negative electrode to the nonwoven fabric separator, is hardly generated during charge/discharge in the nonaqueous electrolyte secondary battery according to the present embodiment. As a result, it is possible to suppress the distortion of the structure caused by the volume change of the negative electrode. Thus, it is possible to suppress the destruction of the nonwoven fabric separator caused by the volume change of the negative electrode. Therefore, it is possible to reduce the thickness of the nonwoven fabric separator.

Also, the thickness of the overall nonwoven fabric separator (overall thickness) can be set to 20 μm or less. The nonaqueous electrolyte secondary battery according to the present embodiment in which the thickness of the overall nonwoven fabric separator is 20 μm or less can provide a higher energy density, and can further suppress the increase in the internal resistance.

The thickness of the nonwoven fabric separator can be further reduced, and for example, can be practically set to 3 μm or more. The thickness of the nonwoven fabric separator is more preferably 15 μm or less, and much more preferably 10 μm or less.

In the nonaqueous electrolyte secondary battery according to the present embodiment, the nonwoven fabric separator is bonded to the surface of at least one of the positive electrode and the negative electrode. The nonwoven fabric separator has the strong bonding strength with the positive electrode or the negative electrode. It can be considered that this is attributed to the chemical bond between the fiber of the nonwoven fabric separator and the oxygen atom which can be present on the olivine-structured Fe, the Mn-containing phosphorus compound or the titanium-containing metal oxide capable of inserting and extracting lithium ions. In the nonaqueous electrolyte secondary battery according to the present embodiment, the nonwoven fabric separator and the positive electrode or the negative electrode exhibit such a high bonding strength, and thus, it is possible to decrease the interfacial resistance between the nonwoven fabric separator and the negative electrode.

It is preferable that the nonwoven separator be bonded to the surface of the negative electrode. This is because the chemical bond between the fiber of the nonwoven fabric separator and the oxygen atom, which can be present on the surface of the titanium-containing metal oxide contained in the negative electrode, is stronger than others.

Meanwhile, in the nonwoven fabric separator made of a self-standing film which is not bonded to the surface of the positive electrode or the negative electrode, it is not possible to reduce the thickness. Also, for example, in the separator made of a porous material such as a polyolefin-based microporous polymer film, it is difficult to enhance the diffusion of lithium ions in the thickness direction. For these reasons, even by using the nonwoven fabric separator made of a self-standing film or the separator made of a porous material, it is not possible to achieve low internal resistance as in the nonaqueous electrolyte secondary battery according to the present embodiment.

In the thickness direction of the non-woven fabric separator, the density of the fiber on the side having contact with the positive electrode is high, and the density of the fiber on the side having contact with the negative electrode is low. For this reason, the nonwoven fabric separator has a sufficient liquid-holding property for an electrolyte solution on the side of the positive electrode. As a result, even if charge contracts the volume of the positive electrode containing the olivine-structured Fe or the Mn-containing phosphorus compound as the positive electrode active material, lots of nonaqueous electrolyte and nonaqueous electrolyte solution can be present between the positive electrode and the nonwoven fabric separator. Thus, the increase in the interfacial resistance between the positive electrode and the nonwoven fabric separator is small, and it is possible to suppress the increase in the internal resistance of the battery.

The thickness of the part of the nonwoven fabric separator where the density of the fiber is high is preferably ⅓ or less of the overall thickness of the nonwoven fabric separator, and more preferably ¹⁄₁₀ or more and ⅕ or less of the overall thickness of the nonwoven fabric separator. By adjusting the thickness of the part of the nonwoven fabric separator where the density of the fiber is high to the above range, the nonwoven fabric separator can show the more excellent permeability of lithium ions, the impregnation property for the nonaqueous electrolyte, and the liquid-holding property for the nonaqueous electrolyte solution.

In the nonaqueous electrolyte secondary battery using the titanium-containing metal oxide capable of inserting and extracting lithium ions as the negative electrode active material, it is possible to increase the porosity of the nonwoven fabric separator. Thus, it is possible to decrease the contact area between the nonwoven fabric separator and the surface of the negative electrode. The smaller the contact area between the nonwoven fabric separator and the surface of the negative electrode is, the further the loss of the movement of lithium ions can be decreased.

In the nonwoven fabric separator, the porosity of the part where the density of the fiber is high is preferably within a range of 25% to 40%, and the porosity of the part where the density of the fiber is low is preferably within a range of 40% to 75%. The nonwoven fabric separator in which the porosity is within the above range can show the more excellent permeability of lithium ions, the impregnation property for the nonaqueous electrolyte, and the liquid-holding property for the nonaqueous electrolyte solution.

The average fiber diameter of the fibers contained in the nonwoven fabric separator is preferably 1 μm or less. Among the nonaqueous electrolyte secondary battery according to the present embodiment, the nonaqueous electrolyte secondary battery in which the average fiber diameter of the fibers contained in the nonwoven fabric separator is 1 μm or less can further increase the porosity of the nonwoven fabric separator. Thus, the nonaqueous electrolyte secondary battery can further decrease the internal resistance value. Practically, the average fiber diameter of the fibers contained in the nonwoven fabric separator can be 10 nm or more.

Among the total fiber contained in the nonwoven fabric separator, the fibers of 30 vol % or more preferably have a fiber diameter of 50 nm or less. This nonwoven fabric separator can ensure the more excellent permeability of lithium ions, the impregnation property for the nonaqueous electrolyte.

Herein, the length of the fiber contained in the nonwoven fabric separator is not particularly limited.

The fiber contained in the nonwoven fabric separator is made of an organic material or an inorganic material. In the present embodiment, the fiber contained in the nonwoven fabric separator is preferably made of an organic material.

Examples of the organic material used as the material for the nonwoven fabric separator include polyamide, polyamide-imide, polyacetal, polybutylene terephthalate, polyethylene terephthalate, syndiotactic polystyrene, polycarbonate, modified polyphenylene ether, polyphenylene sulfide, polyether ether ketone, a liquid crystal polymer, polyvinylidene fluoride, polytetrafluoroethylene, polyether nitrile, polysulfone, polyether sulfone, polyarylate, polyetherimide and thermoplastic polyimide. The fiber contained in the nonwoven fabric separator is formed of at least one selected from the group of these organic materials. It is preferable that the fiber contained in the nonwoven fabric separator contain polyamide-imide.

The fiber containing polyamide-imide has high thermal resistance and high mechanical strength. Thus, it is possible to reduce the thickness of the thin nonwoven fabric separator and to increase the porosity of the nonwoven fabric separator. For these reasons, the present embodiment can achieve the nonaqueous electrolyte secondary battery having high output and excellent durability even in a high-temperature environment.

The fiber containing polyamide-imide can be bonded strongly to the oxygen atom of the lithium-titanium-containing composite oxide, and thus, can be bonded to the surface of the negative electrode with high strength. Among the nonaqueous electrolyte secondary battery according to the present embodiment, the nonaqueous electrolyte secondary battery in which the fiber contained in the nonwoven fabric separator contains polyamide-imide can further decrease the interfacial resistance between the nonwoven fabric separator and the negative electrode because the nonwoven fabric separator and the negative electrode show the higher peel strength.

The nonwoven fabric separator can be formed by, for example, an electrospinning method. According to the electrospinning method, it is possible to form a nonwoven fabric separator containing one fiber in principle. The nonwoven fabric separator formed of the smaller number of fibers can show the higher static strength. For this reason, according to the electrospinning method, it is possible to form the nonwoven fabric separator showing the higher strength and the smaller thickness.

Moreover, according to the electrospinning method, by forming the nonwoven fabric in the state of the lower density of the fiber, it is possible to achieve the higher porosity. In contrast, it is extremely difficult to form the nonwoven fabric separator having high porosity, for example, a porosity of about 75%, by using particles.

Also, according to the electrospinning method, it is possible to obtain the nonwoven fabric separator containing the fibers having a nanometer-order fiber diameter. Also, the nonwoven fabric separator containing the thinner fibers can further enhance the diffusion of lithium ions in the thickness direction.

Next, an example of the measurement method of the fiber diameter of the fibers constituting the nonwoven fabric separator is described.

The fiber diameter of the fibers constituting the nonwoven fabric separator can be measured by, for example, a scanning electron microscope (SEM), a scanning probe microscope (SPM), a transmission electron microscope (TEM), a scanning transmission electron microscope (STEM) or the like.

The measurement of the fiber diameter of the fibers constituting the nonwoven fabric separator can be carried out by using a scanning electron microscope, for example, in the following procedure.

Firstly, the sample to be measured is cut into such a size that can be charged into a scanning electron microscope. The cut sample is charged into a scanning electron microscope, and 3 scanning electron microscope images are randomly taken. The 30 points are randomly selected from the obtained SEM images, and the fiber diameters at respective points are measured. The average value of the fiber diameters of the 30 points are defined as the fiber diameter of the nonwoven fabric separator.

Also, the porosity of the nonwoven fabric separator can be measured by, for example, the mercury penetration method.

Also, the porosity of the nonwoven fabric separator can be calculated by, for example, the following calculation method.

Firstly, a sample of 10 cm×10 cm is cut out, and the volume and mass of the sample and the following equation (1) are used to calculate the porosity.

$$\text{Porosity (\%)} = \{\text{Volume (cm}^3\text{)} - \text{Weight (g)/Density of Material Constituting Nonwoven Fabric Separator (g/cm}^3\text{)}\}/\text{Volume (cm}^3\text{)} \times 100 \quad (1)$$

The nonwoven separator may further contain inorganic fillers. It is preferable that inorganic fillers be present primarily in the portion where the density of the fibers of the nonwoven fabric separator is high because the liquid-holding property for the nonaqueous electrolyte solution is further improved.

As the inorganic filler, it is possible to use alumina, titanium oxide, zinc oxide or the like.

(4) Nonaqueous Electrolyte

Examples of the nonaqueous electrolyte include a liquid, organic electrolyte prepared by dissolving an electrolyte in an organic solvent, a gel-like, organic electrolyte in which a liquid organic solvent and a polymer material are composited, and a solid, nonaqueous electrolyte in which a lithium salt electrolyte and a polymer material are composited. Also, an ambient temperature molten salt (ionic melt) containing a lithium ion can be used as the nonaqueous electrolyte. Examples of the polymer material include polyvinylidene fluoride (PVdF), polyacrylonitrile (PAN), and polyethylene oxide (PEO).

The nonaqueous electrolyte is preferably liquid or gel-like. Also, it is preferable that the nonaqueous electrolyte have a boiling point of 100° C. or more and contain an organic electrolyte or an ambient temperature molten salt.

The liquid nonaqueous electrolyte is prepared by dissolving an electrolyte in an organic solvent at a concentration within a range of 0.5 mol/L to 2.5 mol/L. Because of this liquid nonaqueous electrolyte, it is possible to withdraw a high output even in a low-temperature environment. The concentration of the electrolyte in an organic electrolyte is more preferably within a range of 1.5 mol/L to 2.5 mol/L.

Examples of the electrolyte include $LiBF_4$, $LiPF_6$, $LiAsF_6$, $LiClO_4$, $LiCF_3SO_3$, $LiN(CF_3SO_2)_2$, $LiN(C_2F_5SO_2)_2$, $Li(CF_3SO_2)_3C$, $LiBF_2C_2O_4$ and $LiB[(OCO)_2]_2$. The electrolyte can be used singly or in combination of 2 types or more. Of these, it is preferable to contain lithium tetrafluoroborate ($LiBF_4$). Because of this electrolyte, the chemical stability of an organic solvent is enhanced, it is possible to decrease the film resistance on the negative electrode, and it is possible to significantly improve low-temperature performance and cycle life performance.

Examples of the organic solvent include cyclic carbonates such as propylene carbonate (PC) and ethylene carbonate (EC); linear carbonates such as diethyl carbonate (DEC), dimethyl carbonate (DMC) and methylethyl carbonate (MEC); linear ethers such as dimethoxyethane (DME) and diethoxyethane (DEE); cyclic ethers such as tetrahydrofuran (THF) and dioxolane (DOX); γ-butyrolactone (GBL); acetonitrile (AN); and sulfolane (SL). These organic solvents can be used singly or in a mixture form of 2 types or more.

In particular, the nonaqueous solvent, which contains at least one 1st solvent selected from the group of propylene carbonate (PC), ethylene carbonate (EC) and γ-butyrolactone (GBL), and the 2nd solvent comprised of at least one linear carbonate selected from the group consisting of diethyl carbonate (DEC), methyl ethyl carbonate (MEC) and dimethyl carbonate (DMC), has high stability at high potential of 4.4 V to 4.5 V. For this reason, it is possible to improve the cycle life performance of the nonaqueous electrolyte secondary battery. In particular, the nonaqueous solvent containing ethylene carbonate and diethyl carbonate is excellent in stability at high potential of 4.4 V to 4.5 V, and it is possible to suppress the oxidative decomposition of the nonaqueous electrolyte.

In the nonaqueous solvent containing the 1st solvent and the 2nd solvent, the blending ratio of the 2nd solvent is preferably 70 vol % or more.

The nonaqueous electrolyte can further include an additive.

An additive is not particularly limited, but examples thereof include vinylene carbonate (VC), vinylene acetate (VA), vinylene butyrate, vinylene hexanate, vinylene crotonate, catechol carbonate and propane sultone.

The concentration of the additive is preferably within a range of 0.1 mass % to 3 mass % and more preferable within a range of 0.5 mass % to 1 mass % with respect to 100 mass % of the nonaqueous electrolyte.

(5) Exterior Member

As the exterior member which houses the positive electrode, the negative electrode and the nonaqueous electrolyte, a metal container or an exterior container formed of a laminated film is used.

As a metal container, the metal can formed of aluminum, an aluminum alloy, iron or stainless steel in a rectangular or cylindrical shape is used. Also, the thickness of the metal container is preferably 0.5 mm or less, and more preferably 0.3 mm or less.

The metal can formed of an aluminum alloy is preferably formed of an alloy which contains an element such as manganese, magnesium, zinc or silicon and has an aluminum purity of 99.8% or more. The strength of the metal can formed of the aluminum alloy is significantly high, and thus, the thickness of the metal can can be reduced. As a result, it is possible to achieve the thin and lightweight nonaqueous electrolyte secondary battery which has high power and excellent heat radiation property.

Examples of a laminate film include a multi-layer film in which an aluminum foil is coated with a resin film. As a resin constituting a resin film, it is possible to use a polymer material such as polypropylene (PP), polyethylene (PE), nylon or polyethylene terephthalate (PET). Also, the thickness of the laminated film is preferably 0.2 mm or less. The purity of an aluminum foil is preferably 99.5% or more.

Herein, the present embodiment can be applied to the nonaqueous electrolyte battery having various shapes such as a flat type (thin type), a square type, a cylindrical type, a coin type and a button type.

Also, the nonaqueous electrolyte secondary battery according to the present embodiment can further include a lead which is electrically connected to the electrode group containing the positive electrode and the negative electrode. For example, the nonaqueous electrolyte secondary battery according to the present embodiment can include two leads. In this case, one of the leads is electrically connected to the positive electrode current collector tab and the other lead is electrically connected to the negative electrode current collector tab.

The material of the lead is not particularly limited, but for example, the same material for the positive electrode current collector and the negative electrode current collector is used.

The nonaqueous electrolyte secondary battery according to the present embodiment can further include a terminal which is electrically connected to the aforementioned lead and is drawn from the exterior member described above. For example, the nonaqueous electrolyte secondary battery according to the present embodiment can include two terminals. In this case, one of the terminals is connected to the lead which is electrically connected to the positive electrode current collector tab and the other terminal is connected to the lead which is electrically connected to the negative electrode current collector tab.

The material of the terminal is not particularly limited, but for example, the same material for the positive electrode current collector and the negative electrode current collector is used.

Hereinafter, the nonaqueous electrolyte secondary battery according to the present embodiment is described in more detail with reference to the drawings.

One example of the nonaqueous electrolyte secondary battery according to the present embodiment is described in detail with reference to FIG. 1 to FIG. 3.

FIG. 1 is a schematic perspective view illustrating one example of the nonaqueous electrolyte secondary battery according to the present embodiment in which the nonaqueous electrolyte secondary battery is partially cut off. FIG. 2 is a schematic cross-sectional view illustrated along II-II' in the nonaqueous electrolyte secondary battery illustrated in FIG. 1. FIG. 3 is a schematic cross-sectional view of the negative electrode included in the nonaqueous electrolyte secondary battery illustrated in FIG. 1.

The nonaqueous electrolyte secondary battery 100 includes the electrode group 1, the exterior member 2, the negative electrode terminal 3, the positive electrode terminal 4, and an unillustrated nonaqueous electrolyte.

Figure 2:
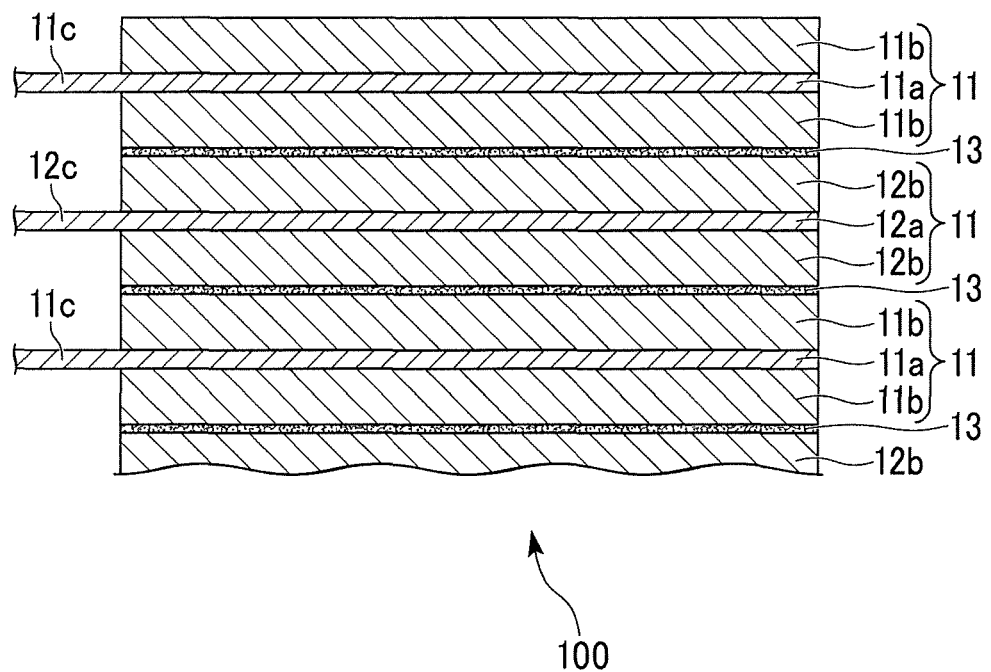
FIG. 2 is a schematic cross-sectional view illustrated along II-II' in the nonaqueous electrolyte secondary battery illustrated in FIG. 1.

As shown in FIG. 2, the electrode group 1 includes the plural negative electrode 11, the plural positive electrode 12 and the plural nonwoven fabric separator 13. The negative electrode 11 and the positive electrode 12 are alternately stacked through the nonwoven fabric separator 13, and thus, the electrode group 1 has the stacked structure.

As shown in FIG. 2, the negative electrode 11 contains the stripe-shaped negative electrode current collector 11a and the negative electrode material layers 11b formed on both sides of the negative electrode current collector 11a. The negative electrode current collector 11a contains the part 11c where the negative electrode material layer 11b is not formed on the surface, and this part 11c functions as the negative electrode current collector tab. In the same manner, as shown in FIG. 2, the positive electrode 12 contains the stripe-shaped positive electrode current collector 12a and the positive electrode material layers 12b formed on both sides of the positive electrode current collector 12a. The positive electrode current collector 12a contains the part 12c where the positive electrode material layer 12b is not formed on the surface, and this part 12c functions as the positive electrode current collector tab.

Also, as shown in FIG. 2, the negative electrode material layer 11b and the positive electrode material layer 12b face each other through the nonwoven fabric separator 13 in the electrode group 1.

The nonwoven separator 13 contains fibers. The nonwoven fabric separator 13 is not a self-standing film, and for example, is supported and fixed on the surface of the negative electrode 11 as shown in FIG. 3. In other words, the nonwoven fabric separator 13 is integrated in the negative electrode 11. For this reason, the negative electrode 11 can be referred to as a fibrous layer-coated electrode.

Figure 4:
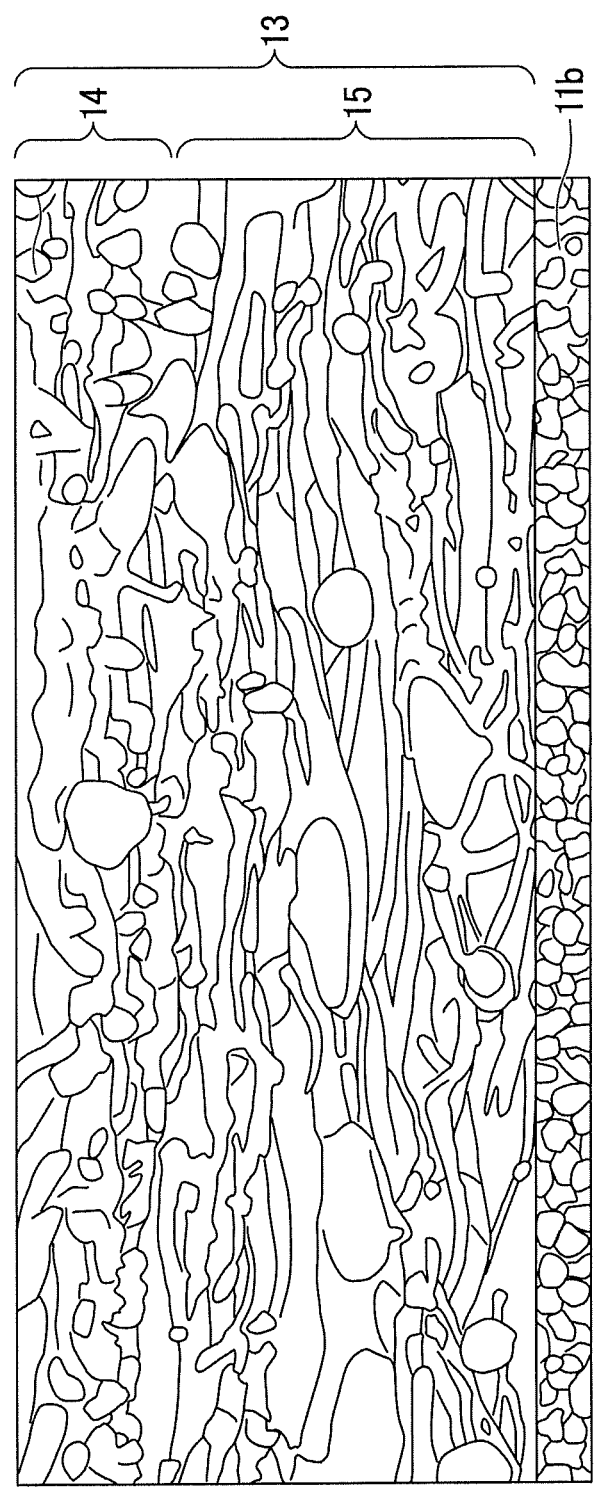
FIG. 4 is a cross-sectional enlarged view of the nonwoven fabric separator.

FIG. 4 is a cross-sectional enlarged view of the nonwoven fabric separator 13. The part 14 where the density of the fiber is high in the nonwoven fabric separator 13 is positioned on the side having contact with the positive electrode 12. The part 15 where the density of the fiber is low in the nonwoven fabric separator 13 is positioned on the side having contact with the negative electrode 11.

Although being unillustrated, the plural negative electrode current collector tabs 11c of the electrode group 1 are bundled into one, and are electrically connected to an unillustrated negative electrode lead. In the same manner, the plural positive electrode current collector tabs 12c of the electrode group 1 are bundled into one, and are electrically connected to an unillustrated positive electrode lead.

As shown in FIG. 1, the electrode group 1 is housed in the exterior member 2. For example, the exterior member 2 is formed of a laminate film. The exterior member 2 houses an unillustrated nonaqueous electrolyte. Thus, the electrode group 1 is impregnated in the nonaqueous electrolyte. Although being unillustrated, a negative electrode lead and a positive electrode lead which are connected to the electrode group 1 are also housed in the exterior member 2.

From one end face of the exterior member 2, the negative electrode terminal 3 and the positive electrode terminal 4 are extended to the outside. The negative electrode terminal 3 is electrically connected to the negative electrode lead in the exterior member 2. In the same manner, the positive terminal 4 is electrically connected to the positive electrode lead in the exterior member 2.

The bonding form of the negative electrode and the nonwoven fabric separator in the nonaqueous electrolyte secondary battery according to the present embodiment is not limited to the form illustrated in FIG. 2. For example, in FIG. 2, the negative electrode 11 at the uppermost stage contains the negative electrode material layers 11 b formed on both surfaces of the negative electrode current collector 11a, but it is possible to omit the negative electrode material layer 11b which does not face the positive electrode material layer 12b.

According to the present embodiment described above, it is possible to provide the nonaqueous electrolyte secondary battery. The nonaqueous electrolyte secondary battery according to the present invention includes the positive electrode, the negative electrode, the nonwoven fabric separator bonded to the surface of at least one of the positive electrode and the negative electrode, and the nonaqueous electrolyte. The positive electrode contains the olivine-structured Fe or the Mn-containing phosphorus compound as the positive electrode active material. The negative electrode contains the titanium-containing metal oxide capable of inserting and extracting lithium ions as the negative electrode active material. The nonwoven fabric separator contains the electrically insulating fiber. In the thickness direction of the nonwoven fabric separator, the density of the fiber on the side having contact with the positive electrode is high, and the density of the fiber on the side having contact with the negative electrode is low. In this nonaqueous electrolyte secondary battery, the interfacial resistance between the positive electrode and the separator during charge/discharge is small, and it is possible to suppress the increase in the internal resistance of the battery. Also, it is possible to further reduce the thickness of the nonwoven fabric separator and to increase the porosity, and thus, it is possible to enhance the diffusion of lithium ions in the thickness direction of the nonwoven fabric separator. Moreover, it is possible to use the fiber containing polyamide-imide having high thermal resistance as the nonwoven fabric separator. Accordingly, the nonaqueous electrolyte secondary battery according to the present embodiment include the positive electrode containing the olivine-structured Fe or the Mn-containing phosphorus compound as the positive electrode active material and the negative electrode containing the titanium-containing metal oxide capable of inserting and extracting lithium ions as the negative electrode active material, and can exhibit low internal resistance and excellent high-temperature durability.

Second Embodiment

Next, the nonaqueous electrolyte secondary battery according to the 2nd embodiment is described.

The nonaqueous electrolyte secondary battery according to the present embodiment includes at least the positive electrode, the negative electrode, the nonwoven fabric separator described in the 1st embodiment and the nonaqueous electrolyte. More specifically, the nonaqueous electrolyte secondary battery according to the present embodiment includes the external member; the positive electrode housed in the external member; the negative electrode which is housed in the external member and is spatially separated from the positive electrode with, for example, the nonwoven fabric separator interposed therebetween; and a nonaqueous electrolyte solution with which the inside of the external member is filled.

Figure 5:
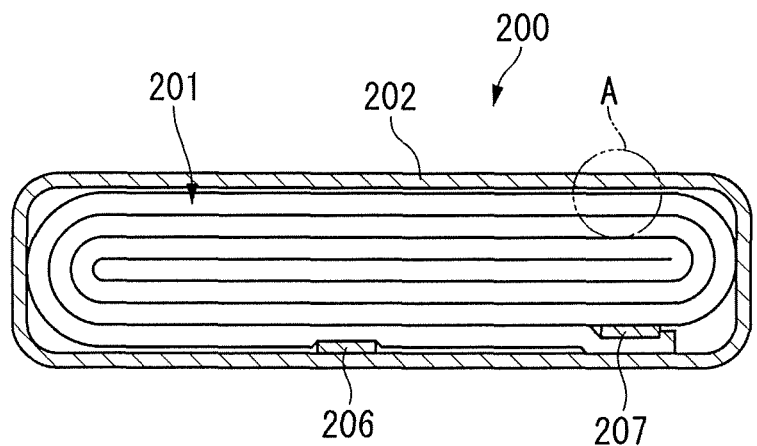
FIG. 5 is a schematic cross-sectional view illustrating an example of the nonaqueous electrolyte secondary battery according to the 2nd embodiment.
Figure 6:
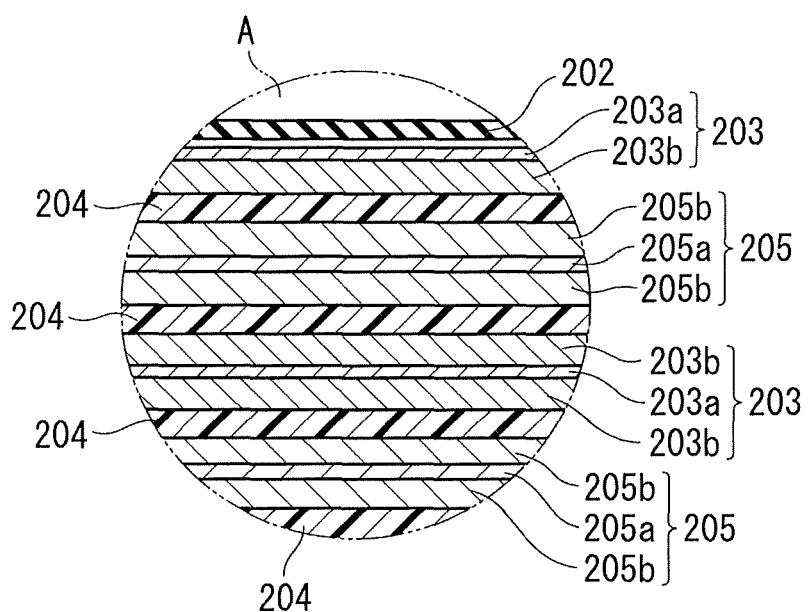
FIG. 6 is an enlarged cross-sectional view of the part A illustrated in FIG. 5.

Hereinafter, the flat type nonaqueous electrolyte secondary battery (nonaqueous electrolyte secondary battery) 200 illustrated in FIG. 5 and FIG. 6 is described as an example of the nonaqueous electrolyte secondary battery according to the present embodiment. FIG. 5 is a schematic cross-sectional view illustrating the flat type nonaqueous electrolyte secondary battery 200. FIG. 6 is an enlarged cross-sectional view of the part A illustrated in FIG. 5. These drawings are schematic diagrams for describing the nonaqueous electrolyte secondary battery according to the embodiment. The shapes, dimensions, ratios, and the like are different from those of actual device at some parts, but design of the shape, dimensions, ratios, and the like can be appropriately modified in consideration of the following description and known technologies.

The flat type nonaqueous electrolyte secondary battery 200 illustrated in FIG. 5 is configured such that the winding electrode group 201 with a flat shape is housed in the exterior member 202. The exterior member 202 may be a container obtained by forming a laminate film in a bag-like shape or may be a metal container. Also, the winding electrode group 201 with the flat shape is formed by spirally winding the stacked product obtained by stacking the negative electrode 203, the separator 204, the positive electrode 205 and the separator 204 from the outside, i.e. the side of the exterior member 202, in this order, followed by performing press-molding. As illustrated in FIG. 6, the negative electrode 203 located at the outermost periphery has the configuration in which the negative electrode layer 203b is formed on one surface of the negative electrode current collector 203a on the inner surface side. The negative electrodes 203 at the parts other than the outermost periphery have the configuration in which the negative electrode layers 203b are formed on both surfaces of the negative current collector 203a. In the flat type nonaqueous electrolyte secondary battery 200 according to the present embodiment, the separator 204 has the structure comprised of the nonwoven fabric separator according to the 1st embodiment. Also, the positive electrode 205 has the configuration in which the positive electrode layers 205b are formed on both surfaces of the positive current collector 205a. Herein, the gel-like nonaqueous electrolyte described above can be used instead of the separator 204.

In the vicinity of the outer peripheral end of the winding electrode group 201 illustrated in FIG. 5, the negative electrode terminal 206 is electrically connected to the negative current collector 203a of the negative electrode 203 of the outermost periphery. The positive electrode terminal 207 is electrically connected to the positive current collector 205a of the inner positive electrode 205. The negative electrode terminal 206 and the positive electrode terminal 207 extend toward the outside of the exterior member 202, and are connected to the extraction electrodes included in the exterior member 202.

When manufacturing the nonaqueous electrolyte secondary battery 200 including the exterior member formed of the laminate film, the winding electrode group 201 to which the negative electrode terminal 206 and the positive electrode terminal 207 are connected is charged in the exterior member 202 having the bag-like shape with an opening. The liquid nonaqueous electrolyte is injected from the opening of the exterior member 202. Then, the opening of the exterior member 202 having a bag-like shape is subjected to heat-sealing in the state of sandwiching the negative electrode terminal 206 and the positive electrode terminal 207 therebetween. Through this process, the winding electrode group 201 and the liquid nonaqueous electrolyte are completely sealed.

Also, when manufacturing the nonaqueous electrolyte battery 200 having the exterior member formed of the metal container, the winding electrode group 201 to which the negative electrode terminal 206 and the positive electrode terminal 207 are connected is charged in the metal container having an opening. The liquid nonaqueous electrolyte is injected from the opening of the exterior member 202. Then, the opening is sealed by mounting a cover member on the metal container.

For the negative electrode terminal 206, it is possible to use the material having electric stability and electroconductivity within a range of a potential equal to or nobler than 1 V and equal to or lower than 3 V with respect to lithium, for example. Specific examples of this material include aluminum and an aluminum alloy containing an element such as Mg, Ti, Zn, Mn, Fe, Cu or Si. Also, it is more preferable that the negative electrode terminal 206 be formed of the same material as the negative current collector 203a in order to reduce the contact resistance with the negative current collector 203a.

For the positive electrode terminal 207, it is possible to use the material having electric stability and electroconductivity within a range of 3 to 4.25 V of a potential with respect to lithium. Specific examples of this material include aluminum and an aluminum alloy containing an element such as Mg, Ti, Zn, Mn, Fe, Cu or Si. It is more preferable that the positive electrode terminal 207 be formed of the same material as the positive current collector 205*a* in order to reduce the contact resistance with the positive current collector 205*a*.

Hereinafter, the exterior member 202, the negative electrode 203, the positive electrode 205, the separator 204, and the nonaqueous electrolyte which are the constituent members of the nonaqueous electrolyte battery 200 are described in detail.

(1) Exterior Member

As the exterior member 202, the exterior member described in the 1 st embodiment is used.

(2) Negative Electrode

As the negative electrode 203, the negative electrode described in the 1st embodiment is used.

(3) Positive Electrode

As the positive electrode 205, the positive electrode described in the 1st embodiment is used.

(4) Separator

As the separator 204, the nonwoven fabric separator described in the 1st embodiment is used.

(5) Nonaqueous Electrolyte

As the nonaqueous electrolyte, the nonaqueous electrolyte described in the 1st embodiment is used.

Figure 7:
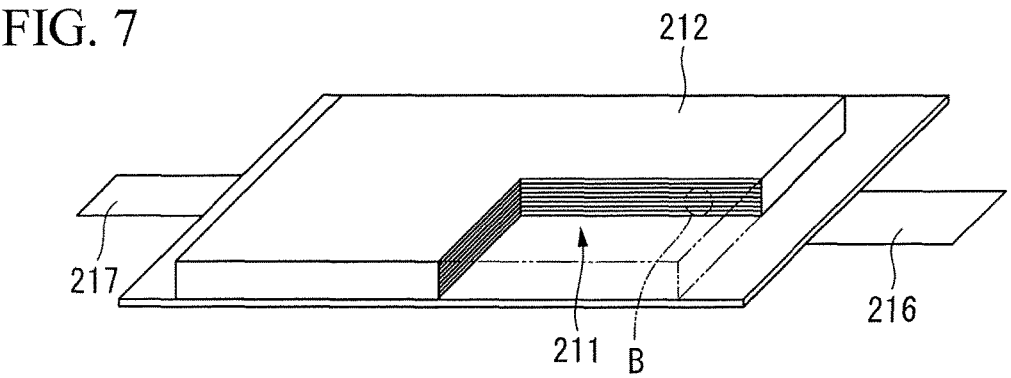
FIG. 7 is a schematic perspective view indicating another example of the nonaqueous electrolyte secondary battery according to the 2nd embodiment in which the nonaqueous electrolyte secondary battery is partially cut off.
Figure 8:
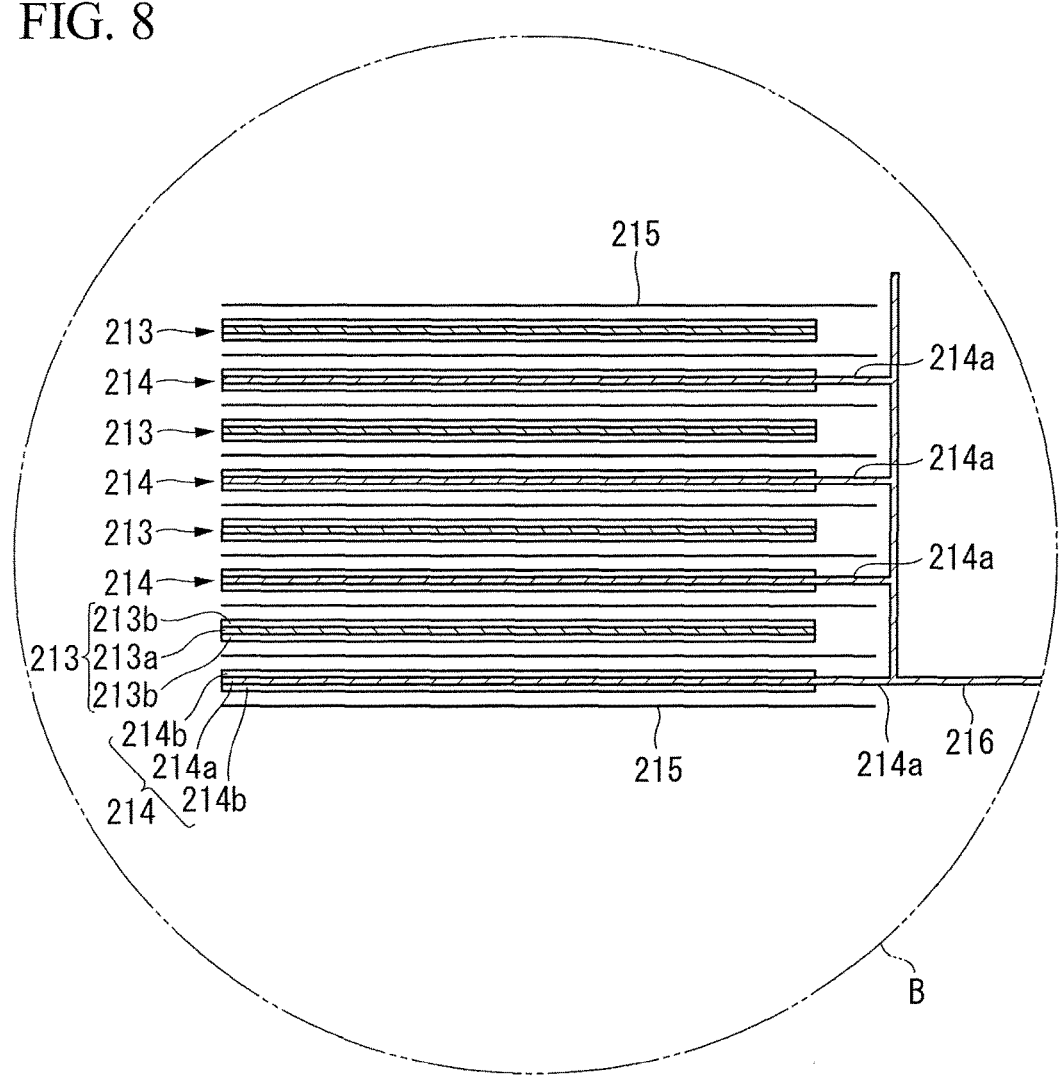
FIG. 8 is an enlarged cross-sectional view of the part B illustrated in FIG. 7.

The configuration of the nonaqueous electrolyte secondary battery according to the 2nd embodiment is not limited to the aforementioned configuration illustrated in FIG. and FIG. 6. For example, the nonaqueous electrolyte secondary battery according to the 2nd embodiment can be the battery having the configuration illustrated in FIG. 7 and FIG. 8. FIG. 7 is a partial cutout perspective view schematically illustrating another flat type nonaqueous electrolyte secondary battery according to the 2nd embodiment. FIG. 8 is an enlarged schematic cross-sectional view of the part B of FIG. 7.

The nonaqueous electrolyte secondary battery illustrated in FIG. 7 and FIG. 8 is configured such that the stacking type electrode group 211 is housed in the exterior member 212. As illustrated in FIG. 8, the stacking type electrode group 211 has the structure in which the positive electrodes 213 and negative electrodes 214 are alternately stacked while interposing separators 215 therebetween.

The plurality of positive electrodes 213 is present, and each includes the positive electrode current collector 213*a* and the positive electrode layers 213*b* supported on both surfaces of the positive electrode current collector 213*a*. The positive electrode layer 213*b* contains the positive electrode active material.

The plurality of negative electrodes 214 is present, and each includes the negative electrode current collector 214*a* and the negative electrode layers 214*b* supported on both surfaces of the negative electrode current collector 214*a*. The negative electrode layer 214*b* contains the negative electrode active material. One side of the negative electrode current collector 214*a* of each negative electrode 214 protrudes from the negative electrode 214. The protruding negative electrode current collector 214*a* is electrically connected to the strip-shaped negative electrode terminal 216. The front end of the strip-shaped negative electrode terminal 216 is drawn from the exterior member 212 to the outside. Although not illustrated, in the positive electrode current collector 213*a* of the positive electrode 213, the side located opposite to the protruding side of the negative electrode current collector 214*a* protrudes from the positive electrode 213. The positive electrode current collector 213*a* protruding from the positive electrode 213 is electrically connected to the strip-shaped positive electrode terminal 217. The front end of the strip-shaped positive electrode terminal 217 is located on an opposite side to the negative electrode terminal 216, and is drawn from the side of the exterior member 212 to the outside.

The material, a mixture ratio, dimensions, and the like of each member included in the nonaqueous electrolyte secondary battery illustrated in FIG. 7 and FIG. 8 are configured to be the same as those of each constituent member of the nonaqueous electrolyte secondary battery 200 described in FIG. 5 and FIG. 6.

According to the present embodiment described above, it is possible to provide the nonaqueous electrolyte secondary battery. The nonaqueous electrolyte secondary battery according to the present invention includes the positive electrode, the negative electrode, the nonwoven fabric separator bonded to the surface of at least one of the positive electrode and the negative electrode, and the nonaqueous electrolyte. The positive electrode contains the olivine-structured Fe or the Mn-containing phosphorus compound as the positive electrode active material. The negative electrode contains the titanium-containing metal oxide capable of inserting and extracting lithium ions as the negative electrode active material. The nonwoven fabric separator contains the electrically insulating fiber. In the thickness direction of the nonwoven fabric separator, the density of the fiber on the side having contact with the positive electrode is high, and the density of the fiber on the side having contact with the negative electrode is low. In this nonaqueous electrolyte secondary battery, the interfacial resistance between the positive electrode and the separator during charge/discharge is small, and it is possible to suppress the increase in the internal resistance of the battery. Also, it is possible to further reduce the thickness of the nonwoven fabric separator and to increase the porosity, and thus, it is possible to enhance the diffusion of lithium ions in the thickness direction of the nonwoven fabric separator. Moreover, it is possible to use the fiber containing polyamide-imide having high thermal resistance as the nonwoven fabric separator. Accordingly, the nonaqueous electrolyte secondary battery according to the present embodiment include the positive electrode containing the olivine-structured Fe or the Mn-containing phosphorus compound as the positive electrode active material and the negative electrode containing the titanium-containing metal oxide capable of inserting and extracting lithium ions as the negative electrode active material, and can exhibit low internal resistance and excellent high-temperature durability.

Third Embodiment

Next, the battery pack of the 3rd embodiment is described in detail.

The battery pack of the present embodiment includes at least one of the nonaqueous electrolyte secondary batteries (i.e. single batteries) of the 1st embodiment and the 2nd embodiment described above. When the plural single batteries are included in the battery pack, the respective single batteries are arranged so as to be electrically connected in series, in parallel, or in series and parallel.

Figure 9:
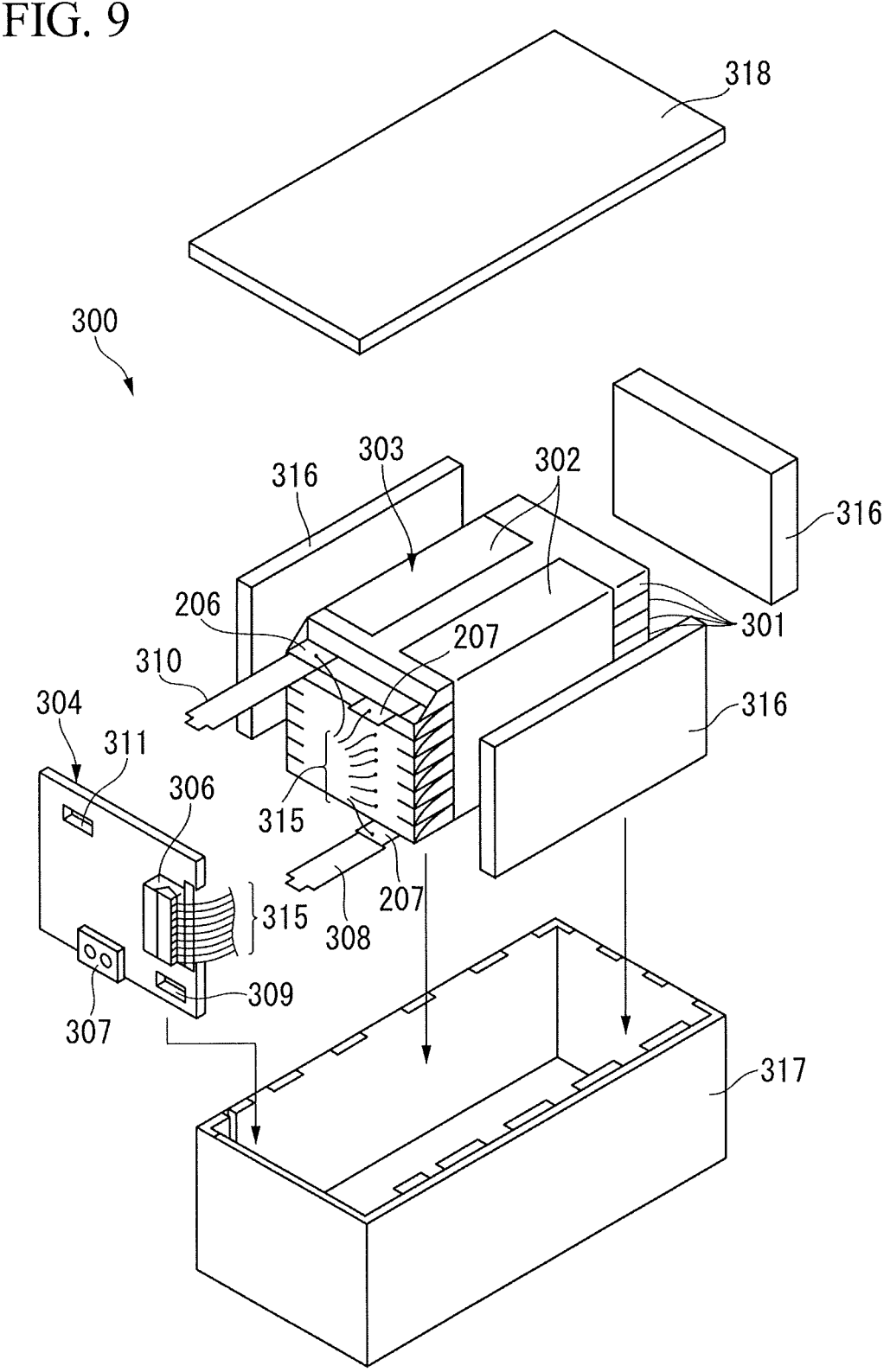
FIG. 9 is a schematic perspective view illustrating the battery pack according to the 3rd embodiment.
Figure 10:
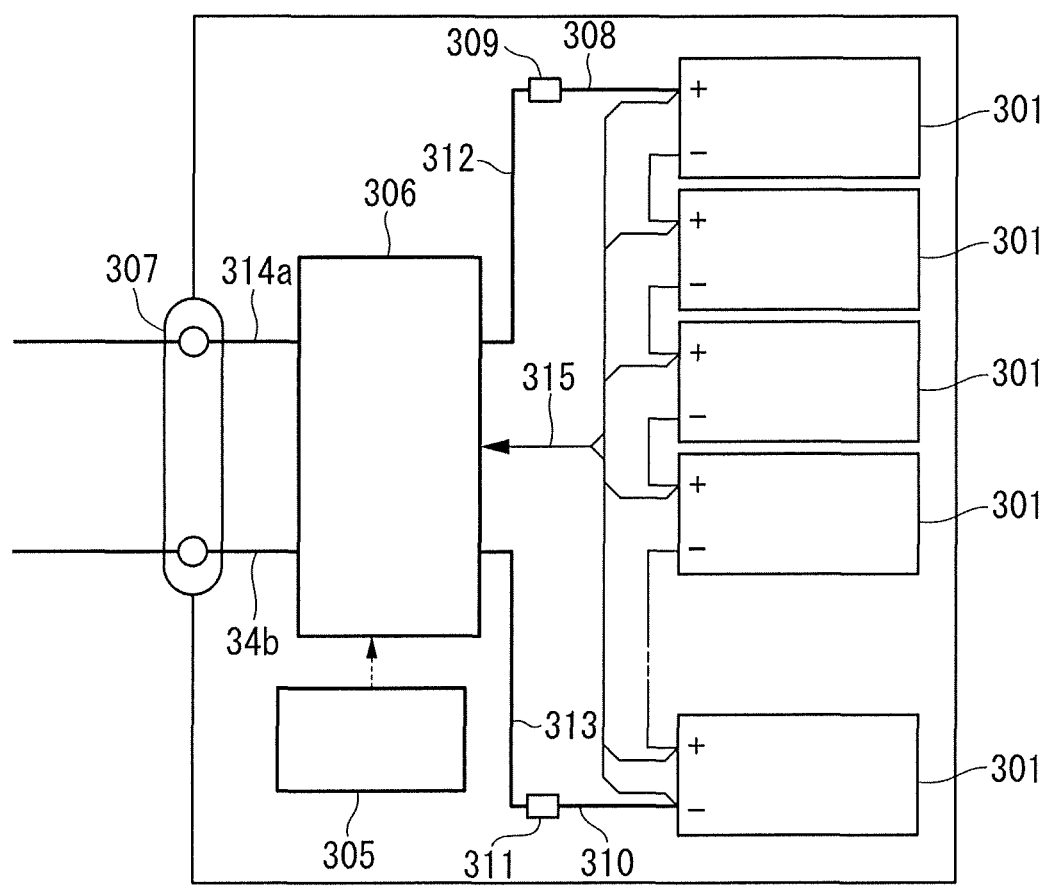
FIG. 10 is a schematic view illustrating the battery pack according to the 3rd embodiment.

Referring to FIG. 9 and FIG. 10, the battery pack 300 according to the present embodiment is described in detail. In the battery pack 300 illustrated in FIG. 9, the flat type nonaqueous electrolyte secondary battery 200 illustrated in FIG. 5 is used as the single battery 301.

The plural single batteries 301 are stacked so that the negative electrode terminals 206 and the positive electrode terminals 207 extending to the outside are arranged in the same direction, and thus the assembled batteries 303 are configured by fastening these with the adhesive tape 302. These single batteries 301 are connected mutually and electrically in series, as illustrated in FIG. 9 and FIG. 10.

The printed wiring board 304 is located so as to face the side surfaces of the single batteries 301 from which the negative electrode terminals 206 and the positive electrode terminals 207 extend. As illustrated in FIG. 9, the thermistor 305 (see FIG. 10), the protective circuit 306 and the energization terminal 307 for an external device are mounted on the printed wiring board 304. Herein, an insulation plate (unillustrated) is mounted on the surface of the printed wiring board 304 facing the assembled batteries 303 in order to avoid unnecessary connection with the wires of the assembled batteries 303.

The positive electrode-side lead 308 is connected to the positive electrode terminal 207 located in the lowermost layer of the assembled batteries 303, and the front end of the positive electrode-side lead is inserted into the positive electrode-side connector 309 of the printed wiring board 304 to be electrically connected. The negative electrode-side lead 310 is connected to the negative electrode terminal 206 located in the uppermost layer of the assembled batteries 303, and the front end of the negative electrode-side lead is inserted into the negative electrode-side connector 311 of the printed wiring board 304 to be electrically connected. These connectors 309, 311 are connected to the protective circuit 306 via wires 312, 313 (see FIG. 10) formed in the printed wiring board 304.

The thermistor 305 is used to detect a temperature of the single battery 301. Although not illustrated in FIG. 9, the thermistor is installed near the single batteries 301, and the detection signal thereof is transmitted to the protective circuit 306. The protective circuit 306 can block the plus-side wire 314a and the minus-side wire 314b between the protective circuit 306 and the energization terminal 307 for an external device under a predetermined condition. Here, for example, the predetermined condition means the case where the detection temperature of the thermistor 305 increases to a predetermined temperature or more. In addition, the predetermined condition also means the case of detecting an overcharge, overdischarge, overcurrent, or the like of the single battery 301. The detection of the overcharge or the like is performed for the respective single batteries 301 or the whole single batteries 301. Herein, when the overcharge or the like is detected in the respective single batteries 301, a battery voltage may be detected, or a positive electrode potential or a negative electrode potential may be detected. In the latter case, a lithium electrode, which is used as a reference electrode, is inserted into the respective single batteries 301. In the case of FIG. 9 and FIG. 10, the wires 315 for voltage detection are connected to the respective single batteries 301, and detection signals are transmitted to the protective circuit 306 via the wires 315.

As illustrated in FIG. 9, the protective sheets 316 formed of rubber or a resin are respectively placed on three side surfaces of the assembled batteries 303 other than the side surface from which the positive electrode terminals 207 and the negative electrode terminals 206 protrude.

The assembled batteries 303 are housed together with the respective protective sheets 316 and the printed wiring board 304 in the housing container 317. In other words, the protective sheets 316 are placed on both inner surfaces of the housing container 317 in the longer side direction and the inner surface of the housing container in the shorter side direction, and the printed wiring board 304 is placed on the inner surface opposite to the protective sheet 316 in the shorter side direction. The assembled batteries 303 are located in the space surrounded by the protective sheets 316 and the printed wiring board 304. The cover 318 is mounted on the upper surface of the housing container 327.

To fix the assembled batteries 303, a thermal shrinkage tape may be used instead of the adhesive tape 302. In this case, protective sheets are placed on both side surfaces of the assembled batteries, the thermal shrinkage tape is circled, and then the thermal shrinkage tape is subjected to thermal shrinkage so that the assembled batteries are fastened.

Herein, FIG. 9 and FIG. 10 illustrate the single batteries 301 connected in series, but in order to increase the battery capacity, the single batteries 301 may be connected in parallel or may be connected in a combination form of series connection and parallel connection. The assembled battery packs can also be further connected in series or in parallel.

According to the present embodiment described above, it is possible to provide the battery pack. The battery pack according to the present embodiment includes at least one of the nonaqueous electrolyte secondary batteries according to the 1st embodiment and the 2nd embodiment described above. This battery pack can exhibit low internal resistance and excellent high-temperature durability.

Herein, the form of the battery pack can be appropriately modified according to a use application. A use application of the battery pack according to the embodiment is preferably one which is required to show excellent cycle characteristics when a large current is extracted. Specifically, the battery pack can be used for power of digital cameras, a two-wheeled or four-wheeled hybrid electric vehicle, a two-wheeled or four-wheeled electric vehicle, an assist bicycle, and the like. In particular, the battery pack obtained by using the nonaqueous electrolyte secondary batteries having excellent high-temperature characteristics is appropriately used for vehicles.

EXAMPLES

Example 1

Figure 3:
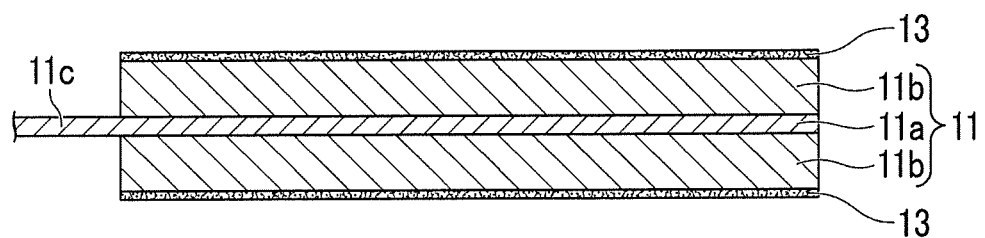
FIG. 3 is a schematic cross-sectional view of the negative electrode.

The following procedure was used to produce the nonaqueous electrolyte secondary batteries corresponding to the nonaqueous electrolyte secondary battery 100 illustrated in FIG. 1 to FIG. 3.

<Productions of Negative Electrode>

As the negative electrode active material, the lithium titanate ($Li_4Ti_5O_{12}$) particles were prepared. The lithium titanate has the spinel structure in which the lithium insertion and extraction potential with respect to the electrode potential of a lithium metal is 2 V to 1.3 V (vs. $Li/Li^+$), and the primary particle of the lithium titanate has the average particle size of 0.6 μm.

In the lithium titanate ($Li_4Ti_5O_{12}$) particles, the graphite powder having the average particle size of 6 μm and PVdF were respectively added as an electroconductive agent and a binder at the mass ratio of 90:8:2. This mixture was dispersed in an n-methylpyrrolidone (NMP) solvent, and was subjected to a ball mill, to thereby prepare the slurry.

The obtained slurry was applied onto both surface of the negative electrode current collector formed of the aluminum foil having a thickness of 12 μm, and was dried and subjected to the hot press process, to thereby obtain the negative electrode in which the thickness of the negative electrode material layer on one side is 20 μm and the electrode density is 2.2 g/cm³. Next, the part of the negative electrode current collector, in which the negative electrode material layer is not formed on the surface, was punched through in the stripe shape, and the negative electrode current collector tab was formed.

<Production of Nonwoven Fabric Separator>

On the negative electrode obtained in this manner, the nonwoven fabric separator was formed by the electrospinning method according to the following procedure.

Firstly, polyamide-imide was dissolved in dimethylacetamide (DMAc) that was a solvent, to thereby prepare the raw material solution which was used to form the fiber layer and had the polyamide-imide concentration of 80 mass %.

Subsequently, the obtained raw material solution was fed by using a metering pump at the feed rate of 5 μL/min from the spinning nozzle to the surface of the negative electrode. At that time, the high voltage generator was used to continue to apply the voltage of 40 kV to the spinning nozzle, and the spinning conditions were adjusted as shown in Table 1 described below.

TABLE 1

| | |
|---|---|
| Traverse Width (mm) | 105 |
| Traverse Rate (mm/s) | 200 |
| Roll Rate (mm/min) | 100 |
| Feed Rate (FR) (mL/h) | 10 |
| Distance Between Stage and Base Material (mm) | 150 |

Under the conditions described above, the film formation was carried out for 3 hours on the basis of the electrospinning method using one spinning nozzle. The negative electrode-integrated structure obtained in this manner, in which the nonwoven fabric separator was bonded to the surface of the negative electrode, was dried under vacuum overnight at ambient temperature. Through this process, the structure including the negative electrode and the nonwoven fabric separator, in which the nonwoven fabric separator containing the polyamide-imide fibers (PAI fibers) was bonded to the surface of the negative electrode, was obtained as shown in FIG. 3.

The obtained structure was subjected to the hot press process using the roll heated at 80° C. to thereby form the nonwoven separator of Example 1.

The cross-section of the nonwoven fabric separator of Example 1 was observed by using the scanning electron microscope (SEM). As a result, the thickness of the nonwoven fabric separator was 10 μm.

Also, in this nonwoven fabric separator, the density of the fiber on the side facing the positive electrode was high, the density of the fiber on the side bonded to the negative electrode was low, and the thickness of the part where the density of the fiber was high was 2 μm which was ⅕ of the thickness of the overall nonwoven fabric separator (the overall thickness).

Also, the porosity of the nonwoven fabric separator was calculated according to the above equation (1), and it was found that the porosity of the part where the density of the fiber was high was 25% and the porosity of the part where the density of the fiber was low was 75%.

Figure 11:
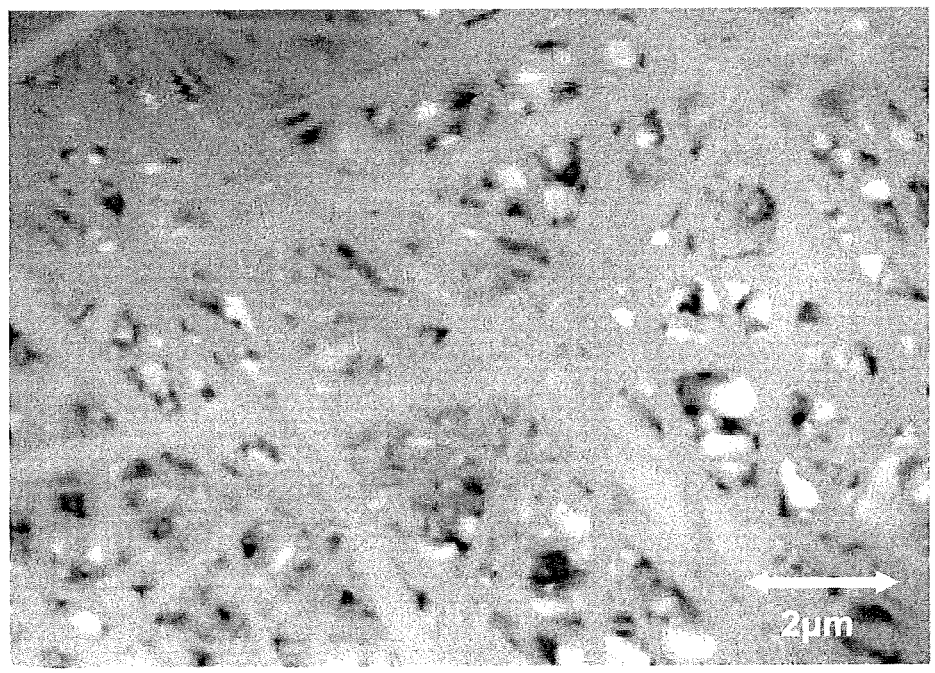

Next, the average fiber diameter of the fibers constituting the nonwoven fabric separator was measured from the SEM image of the cross-section of the nonwoven fabric separator according to the method described above. FIG. 11 show one of the SEM images obtained by observing the cross-section of the nonwoven fabric separator of Example 1. As shown in FIG. 11, the nonwoven fabric separator was comprised of the complicatedly entangled polyamide-imide fibers. Also, the average fiber diameter of the fibers constituting the nonwoven fabric separator was 265 nm.

Table 2 shows the material constituting the nonwoven fabric separator, the thickness of the nonwoven fabric separator, the ratio of the part where the density of the fiber was high in the nonwoven fabric separator, the porosity of the part where the density of the fiber was high in the nonwoven fabric separator, the porosity of the part where the density of the fiber was low in the nonwoven fabric separator, and the average fiber diameter of the fibers constituting the nonwoven fabric separator.

<Production of Positive Electrode>

As the positive electrode active material, the lithium iron phosphate ($LiFePO_4$) particles were prepared. The lithium iron phosphate has the olivine structure, and the primary particle of the lithium iron phosphate has the average particle size of 0.1 μm. Onto the surface of the lithium iron phosphate, the carbon microparticles having the average particle size of 0.005 μm adhered (the adhesion amount: 1 mass %).

In the lithium iron phosphate ($LiFePO_4$) particles, graphite powder and polyacrylic acid were respectively added as an electroconductive agent and a binder at the mass ratio of 90:5:5. This mixture was dispersed in an n-methylpyrrolidone (NMP) solvent, and was subjected to a ball mill, to thereby prepare the slurry.

The obtained slurry was applied onto both surface of the positive electrode current collector formed of the aluminum foil having a thickness of 12 μm, and was dried and subjected to the hot press process, to thereby obtain the positive electrode in which the thickness of the positive electrode material layer on one side is 25 μm and the electrode density is 2.2 g/cm³. Next, the part of the positive electrode current collector, in which the positive electrode material layer is not formed on the surface, was punched through in the stripe shape, and the positive electrode current collector tab was formed.

<Production of Nonaqueous Electrolyte Secondary Battery>

The positive electrode and the structure including the negative electrode and the nonwoven fabric separator produced in the above manner were used to produce the nonaqueous electrolyte secondary battery of Example 1. Herein, the design capacity of the nonaqueous electrolyte secondary battery was set to 3 Ah.

Herein, $LiPF_6$ (electrolyte) was dissolved in the mixed solvent (nonaqueous electrolyte) of propylene carbonate (PC) and diethyl carbonate (DEC) (volume ratio of 1:2) at the concentration of 1.5 mol/L. The obtained organic electrolyte (nonaqueous electrolyte solution) was used as the nonaqueous electrolyte.

Examples 2-7

The nonaqueous electrolyte secondary batteries of Examples 2-7 were produced in the same manner as in Example 1 except that the formation condition for the nonwoven fabric separator on the basis of the electrospinning method and the condition of the hot press process for the nonwoven fabric separator were changed.

Table 2 shows the material constituting the nonwoven fabric separator, the thickness of the nonwoven fabric separator, the ratio of the part where the density of the fiber was high in the nonwoven fabric separator, the porosity of the part where the density of the fiber was high in the nonwoven fabric separator, the porosity of the part where the density of the fiber was low in the nonwoven fabric separator, and the average fiber diameter of the fibers constituting the nonwoven fabric separator.

Example 8

The positive electrode was produced in the same manner as in Example 1 except for using, as the positive electrode active material, the lithium manganese iron phosphate ($LiMn_{0.8}Fe_{0.2}PO_4$) particle having the olivine structure and the average primary particle size of 0.1 μm, onto the surface of which the carbon microparticles having the average particle size of 0.005 μm adhered (the adhesion amount: 3 mass %).

The negative electrode produced in Example 1 was used, and the nonwoven fabric separator bonded to the negative electrode was arranged to face the positive electrode.

The following procedure was carried out in the same manner as in Example 1, to thereby produce the nonaqueous electrolyte secondary battery of Example 8.

Table 2 shows the material constituting the nonwoven fabric separator, the thickness of the nonwoven fabric separator, the ratio of the part where the density of the fiber was high in the nonwoven fabric separator, the porosity of the part where the density of the fiber was high in the nonwoven fabric separator, the porosity of the part where the density of the fiber was low in the nonwoven fabric separator, and the average fiber diameter of the fibers constituting the nonwoven fabric separator.

Example 9

The positive electrode was produced in the same manner as in Example 1 except for using, as the positive electrode active material, the mixture of the lithium manganese iron phosphate ($LiMn_{0.8}Fe_{0.2}PO_4$) particle having the olivine structure and the average primary particle size of 0.1 μm, onto the surface of which the carbon microparticles having the average particle size of 0.005 μm adhered (the adhesion amount: 3 mass %), and the lithium cobalt oxide ($LiCoO_2$) that is the layered lithium cobalt composite oxide having the average primary diameter of 7 μm (the mixing percentage of $LiCoO_2$: 15 mass %).

The negative electrode produced in Example 1 was used, and the nonwoven fabric separator bonded to the negative electrode was arranged to face the positive electrode.

The following procedure was carried out in the same manner as in Example 1, to thereby produce the nonaqueous electrolyte secondary battery of Example 9.

Table 2 shows the material constituting the nonwoven fabric separator, the thickness of the nonwoven fabric separator, the ratio of the part where the density of the fiber was high in the nonwoven fabric separator, the porosity of the part where the density of the fiber was high in the nonwoven fabric separator, the porosity of the part where the density of the fiber was low in the nonwoven fabric separator, and the average fiber diameter of the fibers constituting the nonwoven fabric separator.

Example 10

Polyamide-imide was dissolved in dimethylacetamide (DMAc) that was a solvent, to thereby prepare the solution having the polyamide-imide concentration of 80 mass %. Thereafter, the 10 mass % alumina ($Al_2O_3$) particles (the average particle size: 1.2 μm) were further dispersed in this solution, to thereby prepare the raw material solution that was subjected to the electrospinning method to form the nonwoven fabric separator.

The nonwoven fabric separator was produced in the same manner as in Example 1 except for using this raw material solution.

The negative electrode produced in Example 1 was used, and the nonwoven fabric separator bonded to the negative electrode was arranged to face the positive electrode.

The following procedure was carried out in the same manner as in Example 1, to thereby produce the nonaqueous electrolyte secondary battery of Example 10.

Table 2 shows the material constituting the nonwoven fabric separator, the thickness of the nonwoven fabric separator, the ratio of the part where the density of the fiber was high in the nonwoven fabric separator, the porosity of the part where the density of the fiber was high in the nonwoven fabric separator, the porosity of the part where the density of the fiber was low in the nonwoven fabric separator, and the average fiber diameter of the fibers constituting the nonwoven fabric separator.

Example 11

As the negative electrode active material, the $TiO_2$ (B) particles having the average primary particle size of 1 μm, the BET specific surface area of 20 $m^2/g$, and the Li insertion potential of about 1.5V (vs. Li/Li$^+$) were prepared.

In the $TiO_2$ (B) particles, the graphite powder having the average particle size of 6 μm and PVdF were respectively added as an electroconductive agent and a binder at the mass ratio of 90:8:2. This mixture was dispersed in an n-methyl-pyrrolidone (NMP) solvent, and was subjected to a ball mill, to thereby prepare the slurry.

The obtained slurry was applied onto both surface of the negative electrode current collector formed of the aluminum foil having a thickness of 12 μm, and was dried and subjected to the hot press process, to thereby obtain the negative electrode in which the thickness of the negative electrode material layer on one side is 15 μm and the electrode density is 2.2 $g/cm^3$. Next, the part of the negative electrode current collector, in which the negative electrode material layer is not formed on the surface, was punched through in the stripe shape, and the negative electrode current collector tab was formed.

On the negative electrode obtained in this manner the structure including the negative electrode and the nonwoven fabric separator was formed by the electrospinning method in the same manner as in Example 1.

The negative electrode produced in Example 11 was used, and the nonwoven fabric separator bonded to the negative electrode was arranged to face the positive electrode.

The following procedure was carried out in the same manner as in Example 1, to thereby produce the nonaqueous electrolyte secondary battery of Example 11.

Table 2 shows the material constituting the nonwoven fabric separator, the thickness of the nonwoven fabric separator, the ratio of the part where the density of the fiber was high in the nonwoven fabric separator, the porosity of the part where the density of the fiber was high in the nonwoven fabric separator, the porosity of the part where the density of the fiber was low in the nonwoven fabric separator, and the average fiber diameter of the fibers constituting the nonwoven fabric separator.

Example 12

On the positive electrode obtained in the same manner as in Example 1, the nonwoven fabric separator was formed by the electrospinning method according to the following procedure.

Firstly, among the spinning conditions shown in Table 1, the roll speed was dropped to 70 mm/min, and the film formation was carried out for 1 hour. Thereafter, the roll speed was returned to 100 mm/min, and the film formation was further carried out for 2 hours.

The following procedure was carried out in the same manner as in Example 1, to thereby obtain the structure including the positive electrode and the nonwoven fabric separator in which the nonwoven fabric separator containing the polyamide-imide fibers was bonded to the surface of the positive electrode.

The cross-section of the nonwoven fabric separator of Example 12 was observed by using the scanning electron microscope (SEM). As a result, the thickness of the nonwoven fabric separator was 14.5 µm.

Also, in this nonwoven fabric separator, the density of the fiber on the side bonded to the positive electrode was high, the density of the fiber on the side facing the negative electrode was low, and the thickness of the part where the density of the fiber was high was 4.8 µm which was ⅓ of the thickness of the overall nonwoven fabric separator (the overall thickness).

Also, the porosity of the nonwoven fabric separator was calculated according to the above equation (1), and it was found that the porosity of the part where the density of the fiber was high was 27% and the porosity of the part where the density of the fiber was low was 71%.

Next, the average fiber diameter of the fibers constituting the nonwoven fabric separator was measured from the SEM image of the cross-section of the nonwoven fabric separator according to the method described above, and it was found that the average fiber diameter of the fibers was 310 nm.

This positive electrode was combined with the negative electrode produced in Example 1 (the nonwoven fabric separator containing the polyamide-imide fiber was not bonded to the surface), and the following procedure was carried out in the same manner as in Example 1, to thereby produce the nonaqueous electrolyte secondary battery of Example 12.

Table 2 shows the material constituting the nonwoven fabric separator, the thickness of the nonwoven fabric separator, the ratio of the part where the density of the fiber was high in the nonwoven fabric separator, the porosity of the part where the density of the fiber was high in the nonwoven fabric separator, the porosity of the part where the density of the fiber was low in the nonwoven fabric separator, and the average fiber diameter of the fibers constituting the nonwoven fabric separator.

Example 13

Polyamide-imide was dissolved in dimethylacetamide (DMAc) that was a solvent, to thereby prepare the solution having the polyamide-imide concentration of 80 mass %. Thereafter, the 10 mass % titanium dioxide ($TiO_2$) particles (the average particle size: 1.2 µm) were further dispersed in this solution, to thereby prepare the raw material solution that was subjected to the electrospinning method to form the nonwoven fabric separator.

The nonwoven fabric separator bonded to the positive electrode was produced in the same manner as in Example 12 except for using this raw material solution.

The following procedure was carried out in the same manner as in Example 12, to thereby produce the nonaqueous electrolyte secondary battery of Example 13.

Table 2 shows the material constituting the nonwoven fabric separator, the thickness of the nonwoven fabric separator, the ratio of the part where the density of the fiber was high in the nonwoven fabric separator, the porosity of the part where the density of the fiber was high in the nonwoven fabric separator, the porosity of the part where the density of the fiber was low in the nonwoven fabric separator, and the average fiber diameter of the fibers constituting the nonwoven fabric separator.

Comparative Example 1

The negative electrode was produced in the same manner as in Example 1.

On the obtained negative electrode, the structure including the negative electrode and the nonwoven fabric separator was formed by the electrospinning method in the same manner as in Example 1. At this time, the molding using the hot press process was not carried out.

The cross-section of the obtained nonwoven fabric separator was observed by using the scanning electron microscope (SEM) in the same manner as in Example 1. As a result, the thickness of the nonwoven fabric separator was 14.5 µm.

Also, this nonwoven fabric separator was uniform in the thickness direction, and the part where the density of the fiber was high and the part where the density of the fiber was low did not coexist differently from Examples 1-13.

Also, the porosity of the overall nonwoven fabric separator was calculated according to the above equation (1), and it was found that the porosity was 90%.

Also, the average fiber diameter of the fibers constituting the nonwoven fabric separator was 400 nm.

The negative electrode in which the nonwoven fabric separator was formed was used, and the negative electrode was arranged such that the nonwoven fabric separator faced the positive electrode.

The following procedure was carried out in the same manner as in Example 1, to thereby produce the nonaqueous electrolyte secondary battery of Comparative Example 1.

Table 2 shows the material constituting the nonwoven fabric separator, the thickness of the nonwoven fabric separator, the porosity of the nonwoven fabric separator, and the average fiber diameter of the fibers constituting the nonwoven fabric separator.

Comparative Example 2

The negative electrode was produced in the same manner as in Example 1.

On the obtained negative electrode, the commercially available, self-standing cellulose separator having the thickness of 20 µm (the porosity: 69%) was placed instead of the nonwoven fabric separator.

The cross-section of the cellulose separator was observed by using the scanning electron microscope (SEM) in the same manner as in Example 1. As a result, the thickness of the cellulose separator was 20.0 µm.

Also, this cellulose separator was uniform in the thickness direction, and the part where the density of the fiber was high and the part where the density of the fiber was low did not coexist differently from Examples 1-13.

Also, the porosity of the overall cellulose separator was calculated according to the above equation (1), and it was found that the porosity was 69%.

Also, the average fiber diameter of the fibers constituting the cellulose separator was 1000 nm.

The negative electrode in which the cellulose separator was formed was used, and the negative electrode was arranged such that the cellulose separator faced the positive electrode.

The following procedure was carried out in the same manner as in Example 1, to thereby produce the nonaqueous electrolyte secondary battery of Comparative Example 2.

Table 2 shows the material constituting the cellulose separator, the thickness of the cellulose separator, the porosity of the cellulose separator, and the average fiber diameter of the fibers constituting the cellulose separator.

Comparative Example 3

The negative electrode was produced in the same manner as in Example 1.

The same cellulose separator as in Comparative Example 2 was placed on the obtained negative electrode.

The positive electrode was produced in the same manner as in Example 1 except for using, as the positive electrode active material, the lithium manganese iron phosphate ($LiMn_{0.8}Fe_{0.2}PO_4$) particle having the olivine structure and the average primary particle size of 0.1 μm, onto the surface of which the carbon microparticles having the average particle size of 0.005 μm adhered (the adhesion amount: 3 mass %).

The negative electrode in which the cellulose separator was formed was used, and the negative electrode was arranged such that the cellulose separator faced the positive electrode.

The following procedure was carried out in the same manner as in Example 1, to thereby produce the nonaqueous electrolyte secondary battery of Comparative Example 3.

Table 2 shows the material constituting the cellulose separator, the thickness of the cellulose separator, the porosity of the cellulose separator, and the average fiber diameter of the fibers constituting the cellulose separator.

Comparative Example 4

The negative electrode was produced in the same manner as in Example 1.

The same cellulose separator as in Comparative Example 2 was placed on the obtained negative electrode.

The positive electrode was produced in the same manner as in Example 1 except for using, as the positive electrode active material, the mixture of the lithium manganese iron phosphate ($LiMn_{0.8}Fe_{0.2}PO_4$) particle having the olivine structure and the average primary particle size of 0.1 μm, onto the surface of which the carbon microparticles having the average particle size of 0.005 μm adhered (the adhesion amount: 3 mass %), and the lithium cobalt oxide ($LiCoO_2$) that is the layered lithium cobalt composite oxide having the average primary diameter of 7 μm (the mixing percentage of $LiCoO_2$: 15 mass %).

The negative electrode in which the cellulose separator was formed was used, and the negative electrode was arranged such that the cellulose separator faced the positive electrode.

The following procedure was carried out in the same manner as in Example 1, to thereby produce the nonaqueous electrolyte secondary battery of Comparative Example 4.

Table 2 shows the material constituting the cellulose separator, the thickness of the cellulose separator, the porosity of the cellulose separator, and the average fiber diameter of the fibers constituting the cellulose separator.

Comparative Example 5

The negative electrode was produced in the same manner as in Example 1.

On the obtained negative electrode, the separator formed of the alumina ($Al_2O_3$) particles was placed instead of the nonwoven fabric separator.

The cross-section of the separator formed of the $Al_2O_3$ particles was observed by using the scanning electron microscope (SEM) in the same manner as in Example 1. As a result, the thickness of the separator formed of the $Al_2O_3$ particles was 10.4 μm.

Also, this separator formed of the $Al_2O_3$ particles was uniform in the thickness direction, and the part where the density of the fiber was high and the part where the density of the fiber was low did not coexist differently from Examples 1-13.

Also, the porosity of the overall separator formed of the $Al_2O_3$ particles was calculated according to the above equation (1), and it was found that the porosity was 40%.

The negative electrode in which the separator formed of the $Al_2O_3$ particles was formed was used, and the negative electrode was arranged such that the separator formed of the $Al_2O_3$ particles faced the positive electrode.

The following procedure was carried out in the same manner as in Example 1, to thereby produce the nonaqueous electrolyte secondary battery of Comparative Example 5.

Table 2 shows the material constituting the separator formed of the $Al_2O_3$ particles, the thickness of the separator formed of the $Al_2O_3$ particles, and the porosity of the separator formed of the $Al_2O_3$ particles.

Comparative Example 6

The negative electrode was produced in the same manner as in Example 1 except for using graphite as the negative electrode active material instead of lithium titanate.

The same cellulose separator as in Comparative Example 2 was placed on the obtained negative electrode.

The negative electrode in which the cellulose separator was formed was used, and the negative electrode was arranged such that the cellulose separator faced the positive electrode.

The following procedure was carried out in the same manner as in Example 1, to thereby produce the nonaqueous electrolyte secondary battery of Comparative Example 6.

Table 2 shows the material constituting the cellulose separator, the thickness of the cellulose separator, the porosity of the cellulose separator, and the average fiber diameter of the fibers constituting the cellulose separator.

TABLE 2

| | Positive Electrode Active Material | Negative Electrode Active Material | Material Constituting Separator |
|---|---|---|---|
| Example 1 | LiFePO$_4$ | Spinel Type Li$_4$Ti$_5$O$_{12}$ | PAI Fiber |
| Example 2 | LiFePO$_4$ | Spinel Type Li$_4$Ti$_5$O$_{12}$ | PAI Fiber |
| Example 3 | LiFePO$_4$ | Spinel Type Li$_4$Ti$_5$O$_{12}$ | PAI Fiber |
| Example 4 | LiFePO$_4$ | Spinel Type Li$_4$Ti$_5$O$_{12}$ | PAI Fiber |
| Example 5 | LiFePO$_4$ | Spinel Type Li$_4$Ti$_5$O$_{12}$ | PAI Fiber |
| Example 6 | LiFePO$_4$ | Spinel Type Li$_4$Ti$_5$O$_{12}$ | PAI Fiber |
| Example 7 | LiFePO$_4$ | Spinel Type Li$_4$Ti$_5$O$_{12}$ | PAI Fiber |
| Example 8 | LiMn$_{0.8}$Fe$_{0.2}$PO$_4$ | Spinel Type Li$_4$Ti$_5$O$_{12}$ | PAI Fiber |
| Example 9 | LiMn$_{0.8}$Fe$_{0.2}$PO$_4$ + LiCoO$_2$ | Spinel Type Li$_4$Ti$_5$O$_{12}$ | PAI Fiber |
| Example 10 | LiFePO$_4$ | Spinel Type Li$_4$Ti$_5$O$_{12}$ | PAI Fiber + Al$_2$O$_3$ Particle |
| Example 11 | LiFePO$_4$ | TiO$_2$ (B) | PAI Fiber |
| Example 12 | LiFePO$_4$ | Spinel Type Li$_4$Ti$_5$O$_{12}$ | PAI Fiber |
| Example 13 | LiFePO$_4$ | Spinel Type Li$_4$Ti$_5$O$_{12}$ | PAI Fiber + Al$_2$O$_3$ Particle |
| Comparative Example 1 | LiFePO$_4$ | Spinel Type Li$_4$Ti$_5$O$_{12}$ | PAI Fiber |
| Comparative Example 2 | LiFePO$_4$ | Spinel Type Li$_4$Ti$_5$O$_{12}$ | Cellulose |
| Comparative Example 3 | LiMn$_{0.8}$Fe$_{0.2}$PO$_4$ | Spinel Type Li$_4$Ti$_5$O$_{12}$ | Cellulose |
| Comparative Example 4 | LiMn$_{0.8}$Fe$_{0.2}$PO$_4$ + LiCoO$_2$ | Spinel Type Li$_4$Ti$_5$O$_{12}$ | Cellulose |
| Comparative Example 5 | LiFePO$_4$ | Spinel Type Li$_4$Ti$_5$O$_{12}$ | Al$_2$O$_3$ Particle |
| Comparative Example 6 | LiFePO$_4$ | Graphite | Cellulose |

| | Thickness of Overall Separator (μm) | Ratio of Part Where Density of Fiber was High | Porosity of Part Where Density of Fiber was High (%) | Porosity of Part Where Density of Fiber was Low (%) | Porosity of Overall Separator (%) | Average Fiber Diameter (nm) | Electrode Bonded to Separator |
|---|---|---|---|---|---|---|---|
| Example 1 | 10.0 | 1/5 | 25 | 75 | — | 265 | Negative Electrode |
| Example 2 | 14.6 | 1/3 | 30 | 75 | — | 400 | Negative Electrode |
| Example 3 | 14.4 | 1/3 | 25 | 90 | — | 400 | Negative Electrode |
| Example 4 | 13.2 | 1/5 | 25 | 75 | — | 375 | Negative Electrode |
| Example 5 | 13.5 | 1/5 | 40 | 70 | — | 350 | Negative Electrode |
| Example 6 | 9.9 | 1/5 | 30 | 50 | — | 220 | Negative Electrode |
| Example 7 | 9.9 | 1/2 | 25 | 75 | — | 220 | Negative Electrode |
| Example 8 | 10.0 | 1/5 | 25 | 75 | — | 265 | Negative Electrode |
| Example 9 | 10.0 | 1/5 | 25 | 75 | — | 265 | Negative Electrode |
| Example 10 | 17.0 | 1/3 | 31 | 75 | — | 600 | Negative Electrode |
| Example 11 | 10.0 | 1/5 | 26 | 78 | — | 265 | Negative Electrode |
| Example 12 | 14.5 | 1/3 | 27 | 71 | — | 310 | Positive Electrode |
| Example 13 | 16.7 | 1/3 | 23 | 70 | — | 530 | Positive Electrode |
| Comparative Example 1 | 14.5 | — | — | 90 | 90 | 400 | Negative Electrode |
| Comparative Example 2 | 20.0 | — | — | 69 | 69 | 1000 | Negative Electrode |
| Comparative Example 3 | 20.0 | — | — | 69 | 69 | 1000 | Negative Electrode |
| Comparative Example 4 | 20.0 | — | — | 69 | 69 | 1000 | Negative Electrode |
| Comparative Example 5 | 10.4 | — | — | 40 | 40 | — | Negative Electrode |
| Comparative Example 6 | 20.0 | — | — | 69 | 69 | 1000 | Negative Electrode |

"Measurement of Initial Capacity"

The measurement of the initial capacity was carried out for the nonaqueous electrolyte secondary batteries produced in Examples 1-13 and Comparative Examples 1-6. The initial capacity was measured by the following procedure.

The nonaqueous electrolyte secondary batteries of Examples 1-7, 10-13 and Comparative Examples 1, 2 and 5 were subjected to the constant-current, constant-voltage charge, in which each battery was charged at the constant current of 3 A (1C) to 2.2 V at 25° C., and then, each capacity was measured when each battery was discharged at the current value of 3 A (1C) to 1.2 V. The resultant value was defined as the initial capacity at 25° C. The results are shown in Table 3.

The nonaqueous electrolyte secondary batteries of Examples 8 and 9 and Comparative Examples 3 and 4 were subjected to the constant-current, constant-voltage charge, in which each battery was charged at the constant current of 3 A (1C) to 2.7 V at 25° C., and then, each capacity was measured when each battery was discharged at the current value of 3 A (1C) to 1.5 V. The resultant value was defined as the initial capacity at 25° C. The results are shown in Table 3.

The nonaqueous electrolyte secondary battery of Comparative Example 6 was subjected to the constant-current, constant-voltage charge, in which the battery was charged at the constant current of 3 A (1C) to 3.6 V at 25° C., and then, the capacity was measured when the battery was discharged at the current value of 3 A (1C) to 2 V. The resultant value was defined as the initial capacity at 25° C. The result is shown in Table 3.

It was found from the results of Table 3 that there was no difference in the initial capacity among the nonaqueous electrolyte secondary batteries of Examples 1-13 and the nonaqueous electrolyte secondary batteries of Comparative Examples 1-6.

"Measurement of Initial Resistance"

The measurement of the initial resistance was carried out for the nonaqueous electrolyte secondary batteries produced in Examples 1-13 and Comparative Examples 1-6. The initial resistance was measured by the following procedure.

The nonaqueous electrolyte secondary batteries of Examples 1-13 and Comparative Examples 1-6 were discharged at the current values of 1C (3 A) and 10C (30 A) from the state of charge of 50% (SOC: 50%), and the cell resistance values ($R_1$) were calculated by using the cell batteries after 10 seconds from the discharge. The cell resistance value ($R_1$) was defined as the initial resistance. The results are shown in Table 3.

It was found from the results of Table 3 that the nonaqueous electrolyte secondary batteries of Examples 1-13 had the small initial resistance and the excellent output characteristics as compared with the nonaqueous electrolyte secondary batteries of Comparative Examples 2-6.

"Measurement of Cycle Life"

The measurement of the cycle life was carried out for the nonaqueous electrolyte secondary batteries produced in Examples 1-13 and Comparative Examples 1-6. The cycle life was measured by the following procedure.

The nonaqueous electrolyte secondary batteries of Examples 1-13 and Comparative Examples 1-6 were subjected to the 5C/5C cycle test in which each battery was charged at the current value of 5C (15 A) at 80° C., and then was discharged at the current value of 5C (15 A). The charge voltage and the discharge cutoff voltage were set to the same values as those in the initial capacity measurement. Also, the cycle number, at which the discharge capacity decreased to 80% of the initial capacity, was defined as the cycle life. The results are shown in Table 3.

It was found from the results of Table 3 that the nonaqueous electrolyte secondary batteries of Examples 1-13 had the long cycle life and the excellent high-temperature durability as compared with the nonaqueous electrolyte secondary batteries of Comparative Examples 2-6. Herein, it was found that the nonaqueous electrolyte secondary battery of Comparative Example 1 had the excellent output characteristics but had the short cycle life as compared with the nonaqueous electrolyte secondary batteries of Examples 1-13. Also, in the Comparative Example 6, the internal short-circuit occurred after 50th cycle, and the function of the battery was lost.

"Measurement of Resistance Increasing Ratio"

The measurement of the resistance increasing rate was carried out for the nonaqueous electrolyte secondary batteries produced in Examples 1-13 and Comparative Examples 1-6. The resistance increasing rate was measured by the following procedure.

In the same manner as the measurement of the initial resistance, the resistance value after the 1st cycle (R1) and the resistance value after the 100th cycle (R100) were measured, and the resistance increasing rate (R100/R1) was calculated. The results are shown in Table 3.

It was found from the results of Table 3 that the nonaqueous electrolyte secondary batteries of Examples 1-13 had the small resistance increasing rate and the excellent high-temperature durability as compared with the nonaqueous electrolyte secondary batteries of Comparative Examples 1-6.

TABLE 3

| | Initial Capacity (mAh) | Initial Resistance (mΩ) | 80° C. Cycle Life (Cycle) | Resistance Increasing Rate (%) |
|---|---|---|---|---|
| Example 1 | 3.1 | 3.8 | 3000 | 1.2 |
| Example 2 | 3.0 | 4.2 | 2900 | 1.3 |
| Example 3 | 3.0 | 4.0 | 3100 | 1.2 |
| Example 4 | 3.1 | 4.0 | 3300 | 1.2 |
| Example 5 | 3.1 | 4.0 | 2500 | 1.5 |
| Example 6 | 3.0 | 4.5 | 2800 | 1.4 |
| Example 7 | 3.0 | 4.4 | 3000 | 1.2 |
| Example 8 | 3.0 | 3.8 | 3200 | 1.2 |
| Example 9 | 3.0 | 3.8 | 3100 | 1.2 |
| Example 10 | 3.1 | 4.1 | 3500 | 1.1 |
| Example 11 | 3.2 | 3.9 | 2800 | 1.4 |
| Example 12 | 3.0 | 4.4 | 2700 | 1.5 |
| Example 13 | 3.1 | 4.5 | 3000 | 1.4 |
| Comparative Example 1 | 3.0 | 3.9 | 850 | 2.2 |
| Comparative Example 2 | 3.0 | 5.1 | 500 | 3.2 |
| Comparative Example 3 | 3.0 | 5.3 | 700 | 3.5 |
| Comparative Example 4 | 3.0 | 5.1 | 750 | 3.3 |
| Comparative Example 5 | 2.9 | 5.5 | 900 | 2.7 |
| Comparative Example 6 | 3.0 | 5.5 | *Internal Short-Circuit Occurred at 50th Cycle | — |

While certain embodiments have been described, these embodiments have been presented by way of example only, and are note intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

1: electrode group, 2, 202, 212: exterior member, 3, 206, 216: negative electrode terminal, 4, 207, 217: positive electrode terminal, 11, 203, 214: negative electrode, 12, 205, 213: positive electrode, 13: nonwoven fabric separator, 100, 200: nonaqueous electrolyte secondary battery, 201: winding electrode group, 202: exterior member, 204, 215: separator, 211: lamination type electrode group, 300: battery pack, 301: single battery, 302: adhesive tape, 303: assembled battery, 304: printed wiring board, 305: thermistor, 306: protective circuit, 307: energization terminal, 308: positive electrode-side lead, 309: positive electrode-side connector, 310: negative electrode-side lead, 311: negative electrode-side connector, 312, 313, 315: wire, 316: protective sheet, 317: housing container, 318: cover

The invention claimed is:

1. A nonaqueous electrolyte secondary battery comprising:
- a positive electrode containing olivine-structured Fe or a Mn-containing phosphorus compound as a positive electrode active material;
- a negative electrode containing a titanium-containing metal oxide capable of inserting and extracting lithium ions as a negative electrode active material;
- a nonwoven fabric separator, which contains an electrically insulating fiber and is bonded to a surface of at least one of the positive electrode and the negative electrode; and
- a nonaqueous electrolyte, wherein
- in a thickness direction of the nonwoven fabric separator, a density of the fiber on a side having contact with the positive electrode is high, and a density of the fiber on a side having contact with the negative electrode is low, and
- wherein in the nonwoven fabric separator, an overall thickness is 20 μm or less, and a thickness of part, where the density of the fiber is high, is ⅓ or less of the overall thickness of the nonwoven fabric separator.

2. The nonaqueous electrolyte secondary battery according to claim 1, wherein in the nonwoven fabric separator, a porosity of part, where the density of the fiber is high, is 25% to 40%, and a porosity of part, where the density of the fiber is low, is 40% to 75%.

3. The nonaqueous electrolyte secondary battery according to claim 1, wherein an average fiber diameter of the fibers is within a range of 10 nm to 1000 nm.

4. The nonaqueous electrolyte secondary battery according to claim 1, wherein the fiber is made from an organic material.

5. The nonaqueous electrolyte secondary battery according to claim 4, wherein the organic material contains polyamide-imide.

6. The nonaqueous electrolyte secondary battery according to claim 1, wherein the nonwoven fabric separator is bonded to the surface of the negative electrode.

7. The nonaqueous electrolyte secondary batter) according to claim 1, wherein the nonwoven fabric separator contains an inorganic filler.

8. The nonaqueous electrolyte secondary battery according to claim 7, wherein a content of the inorganic filler at part, where the density of the fiber is high, is higher than a content of the inorganic filler at part where the density of the fiber is low.

9. The nonaqueous electrolyte secondary battery according to claim 7, wherein the inorganic filler is at least one selected from the group consisting of alumina, titan oxide and zinc oxide.

10. The battery pack comprising the nonaqueous electrolyte secondary battery according to claim 1.

11. The nonaqueous electrolyte secondary battery according to claim 1, wherein the titanium-containing metal oxide is at least one selected from the group consisting of titanium oxide, lithium titanium oxide and niobium titanium oxide.

12. The nonaqueous electrolyte secondary battery according to claim 1, wherein the negative electrode includes a negative electrode current collector and a negative electrode layer which is formed on one surface or both surfaces of the negative electrode current collector and contains the negative electrode active material, an electroconductive agent and a binder.

13. The nonaqueous electrolyte secondary battery according to claim 12, wherein the electroconductive agent is at least one selected from the group consisting of acetylene black, carbon black, coke, a carbon fiber, graphite, a metal compound powder, and a metal powder.

* * * * *

UNITED STATES PATENT AND TRADEMARK OFFICE
CERTIFICATE OF CORRECTION

PATENT NO. : 10,283,747 B2  
APPLICATION NO. : 15/125513  
DATED : May 7, 2019  
INVENTOR(S) : Yoshiyuki Isozaki et al.

Page 1 of 1

It is certified that error appears in the above-identified patent and that said Letters Patent is hereby corrected as shown below:

On the Title Page

Item (72), the Inventors Information is incorrect. Item (72) should read:
--(72) Inventors: Yoshiyuki Isozaki, Nerima (JP); Norio Takami, Yokohama (JP); Shinsuke Matsuno, Minato (JP); Keigo Hoshina, Yokohama (JP); Yuma Kikuchi, Kashiwazaki (JP)--

Signed and Sealed this  
Twenty-eighth Day of April, 2020

Andrei Iancu  
*Director of the United States Patent and Trademark Office*